US011803621B1

(12) United States Patent
Strong

(10) Patent No.: US 11,803,621 B1
(45) Date of Patent: Oct. 31, 2023

(54) PERMISSIONS SEARCHING BY SCENARIO

(71) Applicant: Amazon Technologies, Inc., Seattle, WA (US)

(72) Inventor: Homer Strong, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/218,570

(22) Filed: Mar. 31, 2021

(51) Int. Cl.
  *G06F 21/31* (2013.01)
  *G06F 16/903* (2019.01)
  *G06F 21/60* (2013.01)

(52) U.S. Cl.
  CPC ............ *G06F 21/31* (2013.01); *G06F 16/903* (2019.01); *G06F 21/604* (2013.01)

(58) Field of Classification Search
  None
  See application file for complete search history.

(56) References Cited

U.S. PATENT DOCUMENTS

| | | | |
|---|---|---|---|
| 9,336,483 B1 | 5/2016 | Abeysooriya et al. | |
| 9,356,939 B1* | 5/2016 | Gates | H04L 63/104 |
| 9,781,122 B1* | 10/2017 | Wilson | H04L 63/08 |
| 10,095,549 B1 | 10/2018 | Needham et al. | |
| 10,122,757 B1 | 11/2018 | Kruse et al. | |
| 10,581,919 B2 | 3/2020 | Kruse et al. | |
| 10,944,758 B1 | 3/2021 | Nagargadde et al. | |
| 10,984,468 B1 | 4/2021 | Hockey et al. | |
| 10,992,657 B1 | 4/2021 | Stevens et al. | |
| 11,080,336 B2 | 8/2021 | Van Dusen et al. | |
| 11,218,854 B2 | 1/2022 | Raleigh et al. | |
| 11,227,055 B1* | 1/2022 | Badawy | G06F 16/9024 |
| 2002/0165960 A1* | 11/2002 | Chan | G06F 21/604 709/225 |
| 2010/0277497 A1 | 11/2010 | Dong et al. | |
| 2013/0132854 A1 | 5/2013 | Raleigh et al. | |

(Continued)

OTHER PUBLICATIONS

Hummer M, Kunz M, Netter M, Fuchs L, Pemul G. Adaptive identity and access management—contextual data based policies. EURASIP Journal on Information Security. Dec. 2016;2016(1):1-6. (Year: 2016).*

(Continued)

*Primary Examiner* — James R Turchen
(74) *Attorney, Agent, or Firm* — BakerHostetler

(57) ABSTRACT

Context information may be obtained associated with an error corresponding to an operation. The operation may be defined in a programmatic interface, such as a command line interface. The context information may include identity information regarding an identity that operates the programmatic interface, operation information regarding the operation, and result information regarding a result of the operation. A selected resolution interface type for a resolution interface to assist in resolving the error may be selected based at least in part on the context information. The selected resolution interface type may be a permissions search interface. Scenario-based contents of the resolution interface, such as search terms, may be determined, based at least in part on the context information. The resolution interface may be automatically launched. Input for resolving the error, such as selection of an appropriate permissions policy for attachment to the identity, may be received via the resolution interface.

20 Claims, 16 Drawing Sheets

(56) References Cited

U.S. PATENT DOCUMENTS

| | | |
|---|---|---|
| 2013/0246208 A1 | 9/2013 | Jain et al. |
| 2014/0143332 A1 | 5/2014 | Garg et al. |
| 2014/0181965 A1* | 6/2014 | Kling .................. H04L 63/0281 726/21 |
| 2014/0215604 A1 | 7/2014 | Giblin et al. |
| 2014/0289846 A1* | 9/2014 | Moloian ............... G06F 21/604 726/21 |
| 2014/0298423 A1* | 10/2014 | Moloian ............... G06F 16/283 726/4 |
| 2014/0325646 A1 | 10/2014 | Turgeman et al. |
| 2016/0307191 A1 | 10/2016 | Turgeman et al. |
| 2017/0201850 A1 | 7/2017 | Raleigh et al. |
| 2018/0027006 A1 | 1/2018 | Zimmerman et al. |
| 2018/0196955 A1 | 7/2018 | Dageville et al. |
| 2018/0365627 A1 | 12/2018 | Mansour et al. |
| 2019/0182262 A1 | 6/2019 | Raposa |
| 2020/0007555 A1* | 1/2020 | Jadhav ................ H04L 67/1097 |
| 2020/0067861 A1 | 2/2020 | Leddy et al. |
| 2021/0117557 A1* | 4/2021 | Al-Shanqity ....... G06F 21/6218 |
| 2021/0194884 A1* | 6/2021 | Xie ......................... H04L 63/20 |
| 2021/0203687 A1 | 7/2021 | Rabin et al. |
| 2021/0218748 A1* | 7/2021 | Morin ..................... G06F 21/45 |
| 2021/0243190 A1 | 8/2021 | Bargury et al. |
| 2022/0078797 A1 | 3/2022 | Helms et al. |
| 2022/0109677 A1 | 4/2022 | Bajaria et al. |
| 2022/0210162 A1* | 6/2022 | Agarwwal ............ H04L 63/104 |
| 2022/0368726 A1 | 11/2022 | Balasubramaniam et al. |

OTHER PUBLICATIONS

U.S. Appl. No. 17/213,513, filed Mar. 26, 2021, Strong.
U.S. Appl. No. 17/107,082, filed Nov. 13, 2020, Strong et al.
U.S. Appl. No. 17/104,984, filed Nov. 25, 2020, Strong.
U.S. Appl. No. 17/209,782, filed Mar. 23, 2021, Strong et al.
"IAM identifers"; web.archive.org/web/20201030115949/https://docs.aws.amazon.com/IAM/latest/UserGuide/reference_identifiers.html; Amazon Web Sservice, Inc.; web archive from Oct. 30, 2020; accessed Jun. 9, 2022; 8 pages.
Robertson et al.; "The Probabilistic Relevance Framework: BM25 and Beyond"; Foundation and Trends in Information Retrieval; vol. 3 No. 4; 2009; p. 333-389.
Robertson et al.; "Okapi at TREC-3"; Overview of the $3^{rd}$ Text Retrieval Conf.; Jan. 1995; 18 pages.
Jones et al.; "A probabilistic model of information retrieval: development and comparative experiments: Part 2"; Information Processing & Management; vol. 36; 2000; p. 809-840.
Valizadegan et al.; "Learning to Rank by Optimizing NDCG Measure"; In Advances in Neural Information Processing Systems; 2009; p. 1883-1891.
"Security Pillar—AWS Well-Architected Framework"; Amazon Web Services Inc.; Jul. 2020; 46 pages.
Brier et al.; "Verification of Forecasts Expressed in Terms of Probability"; Monthly Weather Review; vol. 78 No. 1; Jan. 1950; 3 pages.
Burks et al.; "Data Augmentation with Generative Models for Improved Malware Detection: A Comparative Study"; IEEE $10^{th}$ Annual Ubiquitous Computing, Electronics Mobile Communication Conf.; 2019; 7 pages.
Joseph Carson; "The 6 Most Disturbing Data Breaches in 2018"; https://thycotic.com/company/blog/2018/07/31/the-6-most-disturbing-data-breaches-in-2018-so-far/; Thycotic; Jul. 2018; accessed Dec. 11, 2021; 10 pages.
Che et al.; "Mode Regularized Generative Adversarial Networks"; arXiv:1612.02136; 2017; 13 pages.
Chen et al.; "MXNet: A Flexible and Efficient Machine Learning Library for Heterogeneous Distributed Systems"; arXiv:1512.01274; 2015; 6 pages.
Gemp et al.; "Weakly semi-supervised neural topic models"; ICLR Limited Labelled Data Workshop; 2019; 8 pages.
Goodfellow et al.; "Generative Adversarial Nets"; In Advances in Neural Information Processing Systems; 2014; p. 2672-2680.
"Risky Business #486—Locking down AWS permissions with RepoKid"; https://risky.biz/RB486/; Risky Business; Feb. 2018; accessed Dec. 11, 2021; 5 pages.
He et al.; "Deep Residual Learning for Image Recognition"; IEEE Conf. on Computer Vision and Pattern Recognition; 2016; p. 770-778.
Chan et al.; "Introducing Aardvark and Repokid"; https://netilixtechblog.com/introducing-aardyark-and-repokid-530081bf3a7e; NetFlix; June 2017; accessed Dec. 11, 2021; 7 pages.
Rezende et al. "Variational Inference with Normalizing Flows"; $32_{nd}$ Int'l Conf. on Machine Learning Research; 2015; p. 1530-1538.
Salimans et al.; "Improved Techniques for Training Gans"; In Advances in Neural Information Processing Systems; 2016; p. 2234-2242.
Snoek et al.; "Practical Bayesian Optimization of Machine Learning Algorithms"; In Adances in Neural Information Processing Systems; 2012; 12 pages.
Srivastava et al.; "Dropout: A Simple Way to Prevent Neural Networks from Overfitting"; Journal of Machine Learning Research; vol. 15; 2014; p. 1929-1958.
Sun et al.; "A Comparison Study of VAE and GAN for Software Fault Prediction"; Int'l Conf. on Algorithms and Architectures for Parallel Processing; Oct. 2020; p. 82-96.
Tolstikhin et al.; "Wasserstein Auto-Encoders"; arXiv1711.01558; 2019; 20 pages.
Turenko et al.; "Oversampling Versus Variational Autoencoders: Employing Synthetic Data for Detection of Heracleum Sosnowskyi in Satellite Images"; Information Science and Applications; May 2020; p. 399-409.
Wang et al.; "Safer Classification by Synthesis"; In NeurIPS Aligned AI Workshop; 2017; 12 pages.
Zhang et al.; "Over-Sampling Algorithm Based on VAE in Imbalanced Classification"; Int'l Conf. on Cloud Computing; 2018; p. 334-344.
Ribeiro et al.; ""Why Should I Trust You?" Explaining the Predictions of Any Classifier"; Proceedings of the $22^{nd}$ ACM SIGKDD Int'l Conf on Knowledge Discovery and Data Mining; Aug. 2016; p. 1135-1144.
Ribeiro et al.; "Anchors: High-Precision Model-Agnostic Explanations";$32^{nd}$ AAAI Conf. on Artificial Intelligence; vol. 32; 2018; 9 pages.
Zhang et al.; "Interpreting Neural Network Judgments via Minimal, Stable, and Symbolic Corrections"; $32^{nd}$ Conf on Neural Information Processing Systems; 2018; 12 pages.
Madry et al.; "Towards Deep Learning Models Resistant to Adversarial Attacks"; Machine Learning; arXiv:1706.06083; 2018; 28 pages.
Tamer et al.; "The Space of Transferable Adversarial Examples"; Machine Learning; arXiv:1704.03453; 2017; 15 pages.
Wang et al.; "Formal Security Analysis of Neural Networks using Symbolic Intervals"; $27^{th}$ USENIX Security Symposium; 2018; 16 pages.
Guo et al.; "On Calibration of Modern Neural Networks"; Machine Learning; arXiv:1706.04599; 2017; 14 pages.
"Trie"; http://web.archive.org/web/20201121014836/https://en.wikipedia.org/wiki/ . . . ; Wikipedia; web archive from Nov. 21, 2020; accessed Jan. 25, 2022; 10 pages.
"DAEG documentation"; http://web.archive.org/web/20181220145725/https://daeg.readthedocs.io/en/lates . . . ; Wikipedia; web archive from Dec. 20, 2018, accessed Jan. 25, 2022; 14 pages.
"Okapi BM25"; http://web.archive.org/web/20201112014911/https://en.wikipedia.org/wiki/ . . . ; Wikipedia; web archive from Nov. 12, 2020; accessed Jan. 25, 2022; 4 pages.
"sklearn.calibration.CalibratedClassifierCV"; http://web.archive.org/web/20201112021039/https://scikit-learn.org/stable/modles/generated/sklearn.calibration.Calibra . . . ; scikit-learn developers; © 2007-2020; web archive from Nov. 12, 2020, accessed Jan. 25, 2022; 3 pages.
"Autoencoder"; http://web.archive.org/web/20201101012432/htps://en.wikipedia.org/wiki/ . . . ; Wikipedia; web archive from Nov. 1, 2020; accessed Jan. 25, 2022; 15 pages.

(56) References Cited

OTHER PUBLICATIONS

"Reinforcement learning"; http://web.archive.org/web/20201106232717/https://en.wikipedia.org/wiki/ . . . ; Wikipedia; web archive from Nov. 6, 2020; accessed Jan. 25, 2022; 13 pages.

"Reviewing and applying recommendations"; https://cloud.google.com/iam/docs/recommender-managing; Oct. 2020; accessed Oct. 21, 2020; 5 pages.

"Enforce least privilege with recommendations"; https://cloud.google.com/iam/docs/recommender-overview; Oct. 2020; accessed Oct. 20, 2020; 13 pages.

Lipton; "The Mythos of Model Interpretability"; ICML Workshop on Human Interpretability in Machine Learning; 2017; 9 pages.

"Why should we use Temperature in softmax?"; http://web.archive.org/web/20201101200714/https://stackoverflow.com/questions/58764619 accessed Jul. 6, 2022; one page.

"Create a custom analyzer"; web.archive.org/web/20201013023944/https://www.elastic.co/guide/en/elasticsearch/reference/current/analysis-custom-analyzer.html; Elasticsearch; © 2020; web archive from Oct. 13, 2020; accessed Jul. 1, 2022; 4 pages.

"Multi-armed bandit"; web.archive.org/web/20201029112217//https://en.wikipedia.org/wiki/Multi-armed_bandit; Wikipedia; web archive from Oct. 29, 2020; accessed Jul. 6, 2022; 19 pages.

"Viewing last accessed information for IAM"; web.archive.org/web/20201028103721/https://docs.aws.amazon.com/IAM/latest/UserGuide/access_policies_access-advisor-view-data.html; Amazon Web Services, Inc.; © 2020; web archive from Oct. 28, 2020; accessed Jul. 6, 2022; 5 pages.

"Similarity module"; web.archive.org/web/20200928065912/https://www.elastic.co/guide/en/elasticsearch/reference/current/index-modules-similarity.html; Elasticsearch; © 2020; web archive from Sep. 28, 2020; accessed Jul. 1, 2022; 8 pages.

"Similarity mapping parameters"; web.archive.org/web/20201029031236/https://www.elastic.co/guide/en/elasticsearch/refernece/cuttent/similarity.html; Elasticsearch; © 2020; web archive from Oct. 29, 2020; accessed Jul. 6, 2022; 3 pages.

Busa-Fekete et al.; "An apple-to-apple comparison of Learning-to-rank algorithms in terms of Normalized Discounted Cumulative Gain"; $20^{th}$ European Conf. on Artificial Intelligence: Preference Learning: Problems and Applications in AI Workshop; vol. 242; 2012; 6 pages.

Tom Fawcett; "An introduction to ROC analysis"; Pattern Recognition Letters; vol. 27; 2006; p. 861-874.

Hagberg et al.; "Exploring network structure, dynamics, and function using network"; Los Alamos National Lab; Technical Report; 2008; 6 pages.

Haveliwala et al.; "Topic-sensitive PageRank: a context-sensitive ranking algorithm for Web search"; IEEE Transactions on Knowledge and Data Engineering; vol. 15 No. 4; Jul./Aug. 2003; p. 784-796.

Liben-Nowell et al.; "The link-prediction problem for social networks"; Journal of the American Society for Information Science and Technology; vol. 58; 2007; p. 1019-1031.

Liu et al.; "Isolation Forest"; $8^{th}$ IEEE Intl Conf. of Data Mining; 2008; p. 413-422.

Menon et al.; "Link Prediction via Matrix Factorization"; Joint European Conf. on Machine Learning and Knowledge Discovery in Databases; 2011; p. 437-452.

Pedregosa et al.; "Scikit-learn: Machine Learning in Python"; Journal of Machine Learning Research; vol. 12; 2011; p. 2825-2830.

J.R. Quinlan; "Generating production rules from decision trees"; In IJCAI; vol. 87; 1987; p. 304-307.

Radlinski et al.; "Learning diverse rankings with multi-armed bandits"; Proceedings of the $25^{th}$ Int'l Conf. on Machine Learning; 2008; p. 784-791.

Rendle et al.; "BPR: Bayesian Personalized Ranking from Implicit Feedback"; arXiv:1205.2618; 2009; p. 452-461.

D. Sculley; "Large scale learning to rank"; NIPS; 2009; 6 pages.

Wang et al.; "Exploring the machine learning models behind Cloud IAM Recommender"; https://cloud.google.com/blog/products/identity-security/exploring-the-machine-learning-models-behind-cloud-iam-recommender; Google; Nov. 2019; accessed Sep. 12, 2022; 4 pages.

Mitra et al.; "A Survey of Role Mining"; ACM Computing Surveys; vol. 48 No. 4; Feb. 2016; p. 50:1-50:37.

Kumar et al.; "Mining RBAC Roles under Cardinality Constraint"; Int'l Conf. on Information Systems Security; 2010; p. 171-185.

* cited by examiner

Policy Creation Interface 800

| Service Section 810 | Suggested Service 811: WWService | Edit 812 |
| Actions Section 820 | Suggested Action 821: Read Only | Edit 822 |
| Resources Section 830 | Suggested Resource 831: MyBucketBBB | Edit 832 |
| Conditions Section 840 | Suggested Condition 841: ConditionCCC | Edit 842 |

FIG. 7

PERMISSIONS SEARCHING BY SCENARIO

CROSS-REFERENCE TO RELATED APPLICATIONS

This application is related to the following application: U.S. patent application Ser. No. 17/104,984 filed Nov. 25, 2020, entitled "CONTEXTUAL POLICY WEIGHTING FOR PERMISSIONS SEARCHING".

BACKGROUND

Identity management services may allow customers to control and manage access to resources by creating identities (e.g., users, groups, roles, etc.) and defining permissions for the identities. In some examples, permissions for an identity may be defined by attaching policies to an identity. Some example policy names may include a name of a service and a corresponding permission (e.g., AAServiceReadOnly, BBServiceFullAcess, etc.), while some other example policy names may include a job function (e.g., DataScientist, Billing, etc.). An identity management service may provide an interface, such as a web console interface, that allows a customer to select a given identity and to search for permissions to attach to the given identity, for example by entering search terms into a text entry field. In some examples, an available policy corpus may include both vendor-managed policies as well as private customer-defined policies. In some examples, there may be large quantities of available policies from which to search. For example, in some cases, a given vendor may offer five-hundred or more managed policies, while large customers could have up to ten-thousand policies.

BRIEF DESCRIPTION OF DRAWINGS

The following detailed description may be better understood when read in conjunction with the appended drawings. For the purposes of illustration, there are shown in the drawings example embodiments of various aspects of the disclosure; however, the invention is not limited to the specific methods and instrumentalities disclosed.

FIG. 7 is a diagram illustrating an example policy creation interface with inferred feature suggestions that may be used in accordance with the present disclosure.

DETAILED DESCRIPTION

Figure 1:
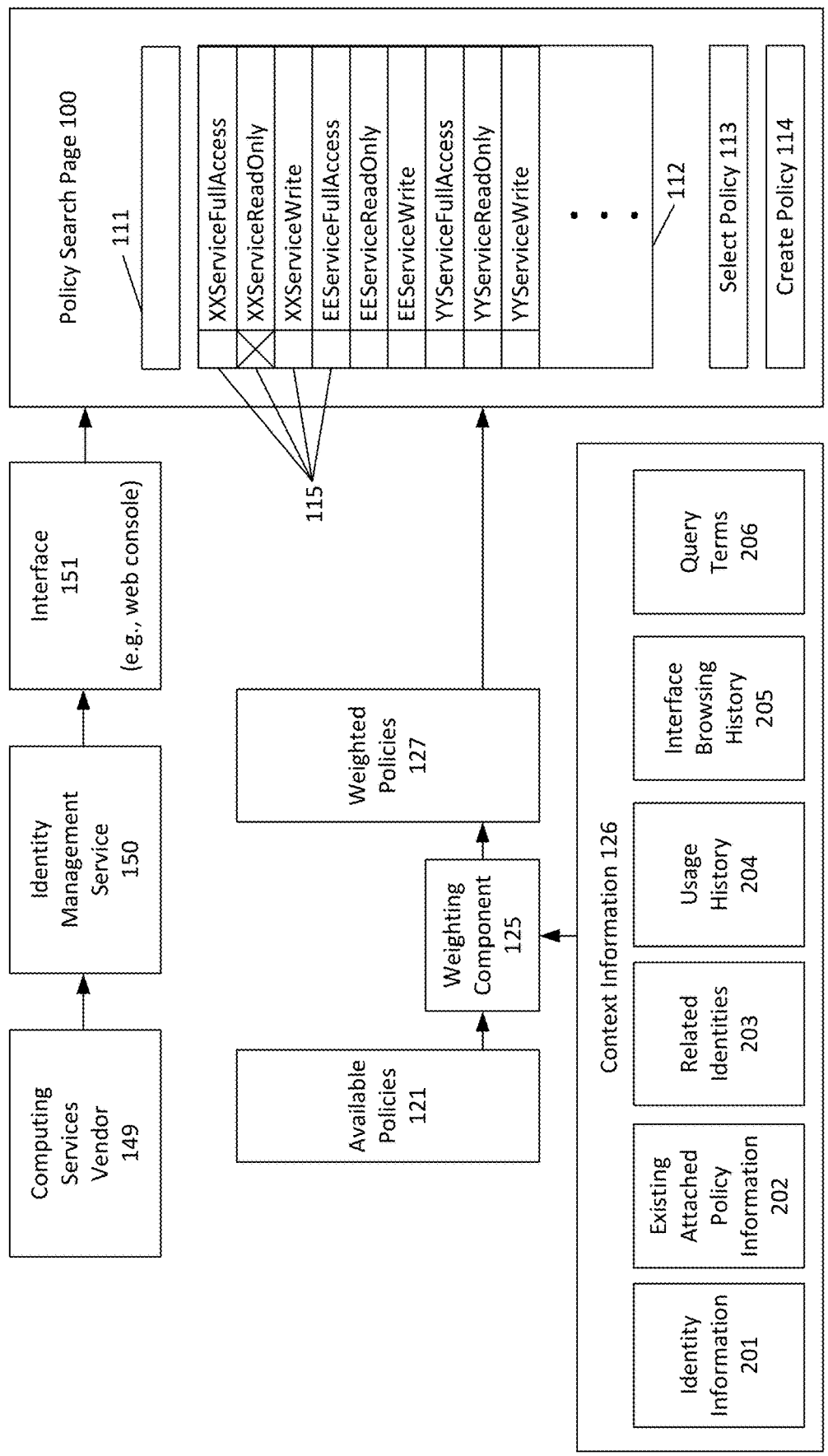
FIG. 1 is a diagram illustrating an example weighted policy search system that may be used in accordance with the present disclosure.

Techniques for contextual policy weighting for permissions searching are described herein. The described techniques may be employed by an identity management service, which may allow customers to control and manage access to resources by creating identities (e.g., users, groups, roles, etc.) and defining permissions for the identities. The identity management service may provide an interface, such as a web console interface, that allows a user, such as an administrator, to select a given identity and to search for permissions to attach to the given identity. In one specific example, a user may select a given identity for which to define permissions by navigating to an identity page for the given identity within the web console. The user may then select an attach policies button, or other control, on the identity page in order to search for policies to attach to the identity. Selection of this control may cause a search page to be displayed to the user. In some examples, the search page may include a text entry field as well as a display area that includes a scrollable list of selectable policies. In one specific example, a policy may be selected by checking a respective checkbox or other selection control, such as may be adjacent to the policy in the scrollable policy list.

As described above, in some cases, there may be large quantities of available policies from which to search to find a selected policy. In some conventional techniques, query terms, which are entered by a user, such as via the text entry field within the search page, are used to filter the corpus of available policies. In one specific example, the filtering is performed on a case-insensitive substring match of the entered query terms. For example, policy names that include a case-insensitive substring match of a query substring are filtered-in such that they are included in the filtered policies, while policy names that don't include a substring match re filtered out and dropped. The resulting filtered policies are then displayed in the scrollable policy list in lexicographical (e.g., alphabetical/numerical) order.

One problem with these and other similar conventional techniques is that the resulting set of filtered policy names, which are determined based on query term matching, may still be quite large, thereby potentially forcing a user to scroll through large quantities of undesired policies to find a selected policy name. For example, if a user types the query terms "read only" into a text entry field, a conventional search page could potentially return a list that includes all policies that provide read-only access to any service offered by, or affiliated with, the vendor. For major vendors that provide large quantities of affiliated services, this may be a long list that includes many read-only policies. Moreover, because naming conventions and formats may differ between different policies and services, a user may be unsure of the lexicographical position of a policy name within the ordered list. Specifically, many policy names may indicate services by placing a name of a parent vendor that provides the service at start of the service's name. This may cause many policy names to start with the same letter (e.g., the first letter of the parent vendor's name) and may also cause the policy name to appear in a different lexicographical order than the user was expecting, thereby causing confusion and frustration. Yet another problem with conventional techniques is that policies that grant full administrator access, which may often be named AdministratorAccess (or similar), may commonly appear at the top of the policy listing, for example because the word "administrator" may often be one of the first words listed when policies are placed in alphabetical order. This high listing of the administrator access policy, in combination with the difficulty of finding a selected policy name, may cause users to grant administrator access to policies for which administrator access is not actually required, thereby resulting in potential misappropriation of permissions and other potential security and privacy concerns.

To address these and other concerns, the techniques described herein may allow policies to be weighted (e.g., ranked) based on relevant context information. The weighted policies may then be displayed in an order based on their respective weights. A policy's position in an ordered list may be determined based on its respective weight (e.g., rank), for example such that higher weighted policies are displayed with a higher priority (e.g., higher up in the list), while lower weighted policies are displayed with a lower priority (e.g., further down in the list). In some examples, the context information that is used to weight the policies may include identity information (e.g., identity name, identity age, etc.), existing attached policy information, related identities (e.g., other identities within the same account), usage history, console browsing history, query terms, and other information. Thus, the techniques described herein may allow search results to be provided based on information other than merely manually-entered query terms and may also allow search results to be weighted based on context.

In some examples, when a user selects a given identity to which to attach a policy (e.g., by navigating to a respective page for the entity in the console and clicking an attach policy button), information about the identity may be used to weight the list of policies. As a specific example, many identity names may often include a name of a service with which the identity is associated. For example, an identity associated with a service called XXService might be named My-XXService-Role, while another identity associated with a service called YYService might be named My-YYService-Role. Some conventional searches of policy names might yield exactly the same results in exactly the same order for both My-XXService-Role and My-YYService-Role, even though these roles are clearly associated with different respective services. By contrast, the techniques described herein may allow policies associated with XXService to appear at the top of the policy listing for My-XXService-Role, while also allowing policies associated with YYService to appear at the top of the policy listing for My-YYService-Role.

In addition to or as an alternative to identity information, other forms of context information may also be used to weight the policies. For example, in some cases, existing policy information may be used, which may include information regarding existing policies already attached to the identity and/or to related identities (e.g., identities within the same account). For example, in some cases, a weighting component may determine that AAService is frequently used in combination with another service named XXService. In this example, a weighting component may examine the existing policies that have already been attached to an identity named First-Example-Role and determine that a policy named AAServiceFullAccess has already been attached to First-Example-Role. Thus, because the weighting component knows that the First-Example-Role has already been granted access to AAservice, and because the weighting component also knows that AAService is frequently used in combination with XXService, the weighting component may choose to assign higher weights to policies associated with XXService than to other policies. In another example, a weighting component may weight policies for the First-Example-Role identity by looking at other related identities that have been created within a same account as First-Example-Role. In this example, the weighting component may determine that each of these other related identities has been assigned a policy named XXServiceFullAccess. Thus, because the weighting component knows that these related identities have already been assigned the XXServiceFullAccess policy, the weighting component may choose to assign a higher weight to the XXServiceFullAccess policy than to other policies.

Additionally, in some examples, the weighting of policy names may be performed based at least in part on a usage history of the identity. For example, a weighting component may weight policies for the First-Example-Role identity by looking at the identity's usage history, such as to determine services that have been frequently and/or recently used by the identity. In this example, the weighting component may determine that First-Example-Role has frequently and/or recently accessed AAService. As described above, the weighting component may also know that AAService is frequently used in combination with XXService. Thus, because the weighting component knows that First-Example-Role has frequently and/or recently accessed AAservice, and because the weighting component also knows that AAService is frequently used in combination with XXService, the weighting component may choose to assign higher weights to policies associated with XXService than to other policies.

FIG. 1 is a diagram illustrating an example weighted policy search system that may be used in accordance with the present disclosure. As shown, an identity management service 150 is operated by a computing services vendor 149. The identity management service 150 is a service that allows customers to control and manage access to resources by creating identities (e.g., users, groups, roles, etc.) and defining permissions for the identities. In the example of FIG. 1, the identity management service 150 provides an interface 151, such as a web console. The interface 151 includes a policy search page 100, which allows a user to search for permissions to attach to a given identity. In some examples, a user, such as an administrator, may select a given identity for which to define permissions by navigating to an identity page (not shown in FIG. 1) for the given identity within the web console. The user may then select an attach policies button, or other control, on the identity page in order to search for policies to attach to the identity. Selection of this control may cause policy search page 100 to be displayed to the user. In other examples, the user could navigate first to policy search page 100 (without previously selecting an identity) to select a policy, and the user could then subsequently use the interface 151 to select one or more identities to which to attach the selected policy.

As shown in FIG. 1, the policy search page 100 includes a text entry field 111, a display area 112, a select policy button 113, and a create policy button 114. In the example of FIG. 1, the text entry field 111 is blank, meaning that the user has not yet typed any query terms into the text entry field. The display area 112 includes a scrollable list of selectable policies. In one specific example, a policy may be selected by checking a respective checkbox 115, which in this example is displayed to the left of each policy in the scrollable policy list. In the example of FIG. 1, the user has selected the XXServiceReadOnly policy by checking the checkbox 115 to the left of the XXServiceReadOnly policy. The user may then click the select policy button 113 to cause the XXServiceReadOnly policy to be attached to an identity. In some examples, multiple policies may be selected from the scrollable list when the user clicks the select policy button 113, and those multiple selected policies may then be attached to the identity.

As shown in FIG. 1, available policies 121 are permissions policies that are available to a customer that is interacting with the interface 151. The available policies 121 may include both vendor-managed policies, such as may be managed by computing services vendor 149, as well as private customer-defined policies. In some examples, there may be large quantities of available policies from which to search. For example, in some cases, a given vendor may offer five-hundred or more managed policies, while large customers could have up to ten-thousand policies. The techniques described herein may allow available policies 121 to be weighted (e.g., ranked) based on context information 126. In the example of FIG. 1, a weighting component 125 employs the context information 126 to form weighted policies 127 by assigning weights the available policies 121. The weighted policies 127 are then displayed in display area 112 based on their respective weights. The display area 112 includes an ordered list of policies. A policy's position in the ordered list may be determined based on its respective weight (e.g., rank), for example such that higher weighted policies are displayed with a higher priority (e.g., higher up in the list), while lower weighted policies are displayed with a lower priority (e.g., further down in the list). For example, in FIG. 1, XXServiceFullAccess is the highest weighted search result and is, therefore, shown at the top of the scrollable list. XXServiceReadOnly is the second-highest weighted search result and is, therefore, shown second form the top of the scrollable list. Other policies are weighted and displayed in the scrollable list accordingly.

In the example of FIG. 1, the context information 126 includes identity information 201 (e.g., identity name, identity age, etc.), existing attached policy information 202, related identities 203 (e.g., other identities within the same account), usage history 204, interface browsing history 205, and query terms 206. The context information 126 may optionally include other information not shown in FIG. 1.

Figure 2:
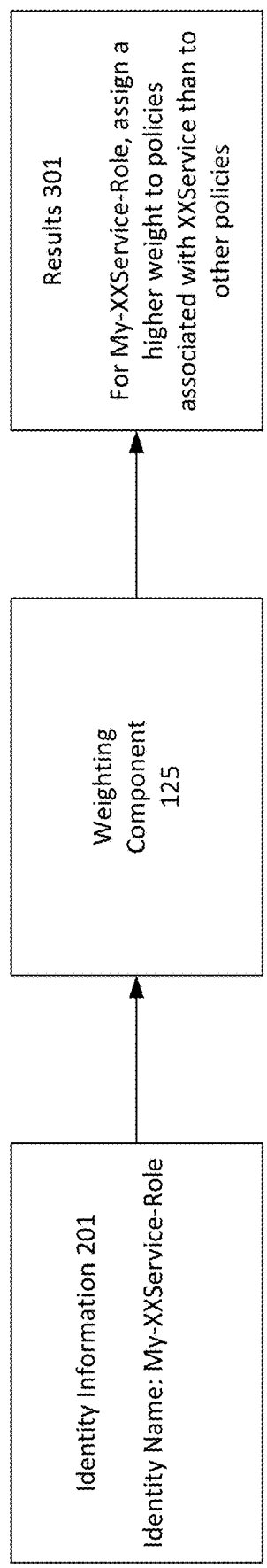
FIG. 2 is a diagram illustrating a first example policy weighting based on identity information that may be used in accordance with the present disclosure.

In some examples, when a user selects a given identity to which to attach a policy (e.g., by navigating to a respective page for the entity in the console and clicking an attach policy button), information about the identity may be used to weight the list of policies. Specifically, identity information 201 includes information about the identity for which a policy search is being conducted, such as the identity name, identity age, and the like. Referring now to FIG. 2, an example is shown in which identity information 201 indicates that the name of an identity for which a search is being conducted is My-XXService-Role. In the example of FIG. 2, weighting component 125 receives the identity information 201 and determines that the identity name (My-XXService-Role) is clearly associated with the XXService. Based on this determination, as shown in results 301, the weighting component decides that to assign higher weights to policies associated with XXService than to other policies. Accordingly, referring back to FIG. 1, it is seen that policies associated with XXService are the highest weighted policies and are therefore displayed at the top of the ordered list in display area 112.

Figure 3:
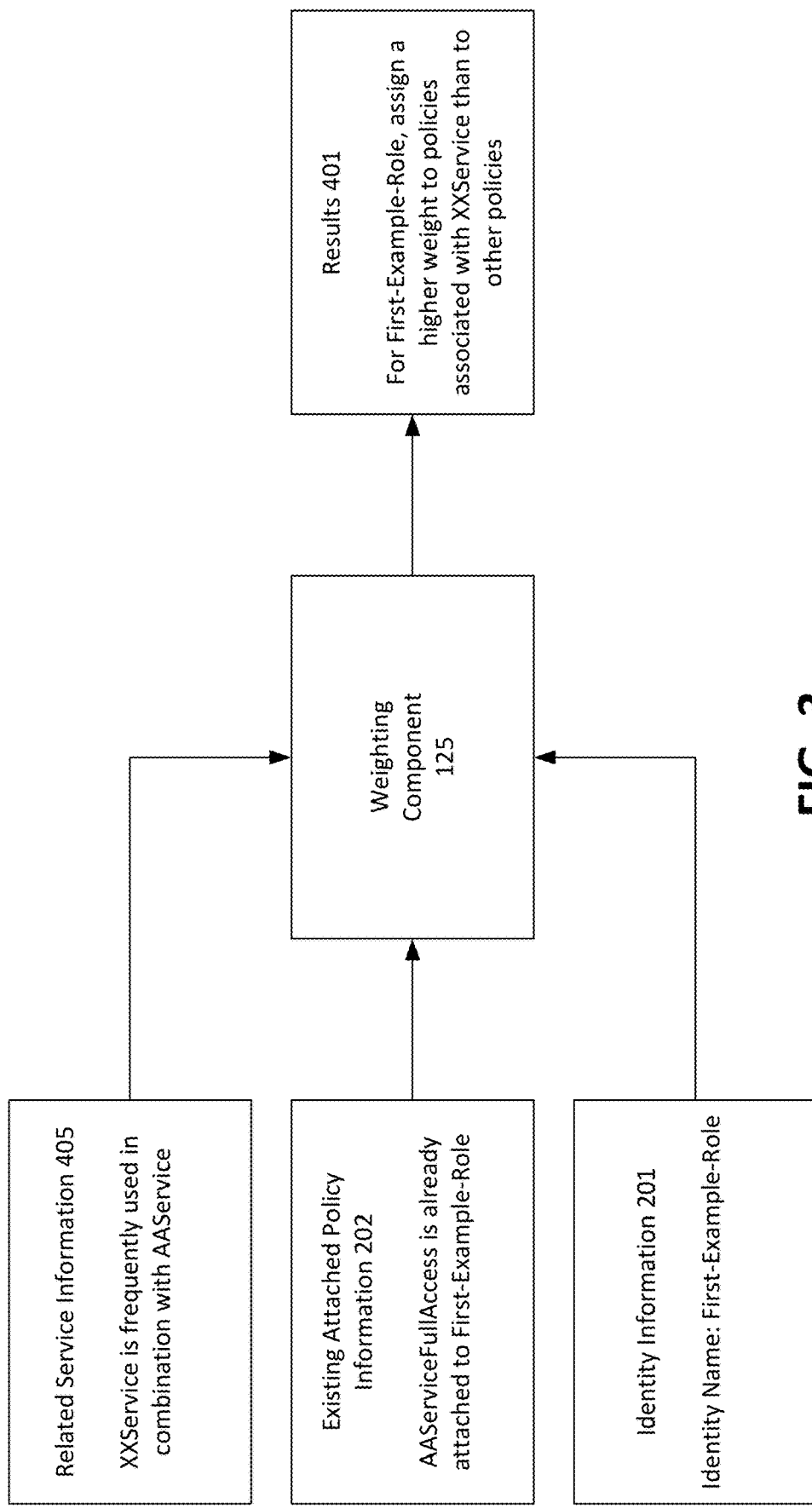
FIG. 3 is a diagram illustrating a second example policy weighting based on existing attached policy information that may be used in accordance with the present disclosure.
Figure 4:
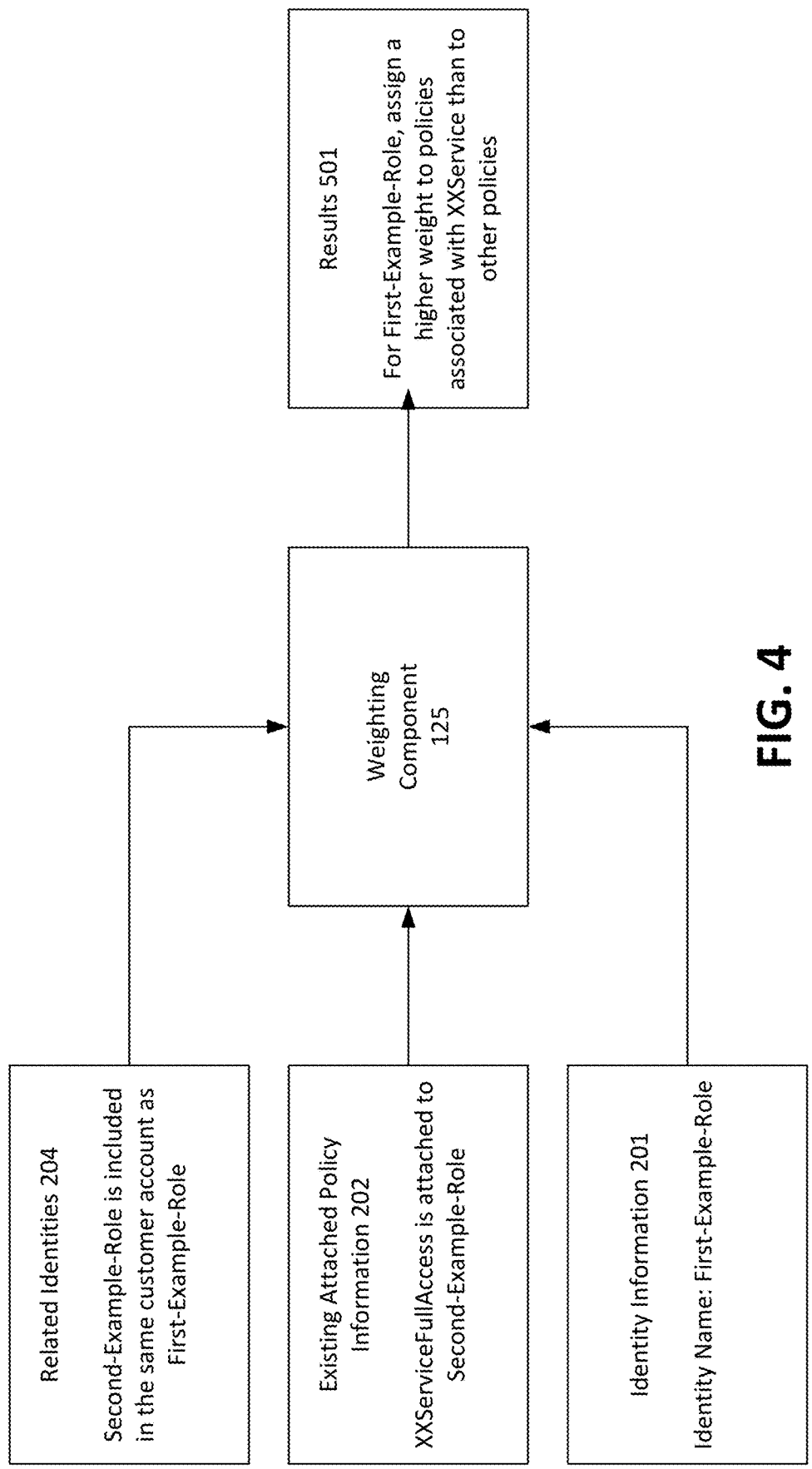
FIG. 4 is a diagram illustrating a third example policy weighting based on related identities that may be used in accordance with the present disclosure.

In addition or as an alternative to identity information 201, other forms of context information 126 may also be used to weight the policies. Referring now to FIGS. 3-4, examples are shown in which policies are weighted based on existing attached policy information 202. In the example of FIG. 3, a user has requested a policy search in order to find and select a policy for attachment to an identity named First-Example-Role, as indicated by identity information 201 of FIG. 3. However, in this case, the identity name (First-Example-Role) is not clearly linked to any specific service. However, as shown in FIG. 3, the weighting component 125 receives existing attached policy information 202, which, in this example, indicates that a policy named AAServiceFullAccess is already attached to First-Example-Role. Additionally, in the example of FIG. 3, the weighting component 125 also receives related service information 405, which indicates that AAService is frequently used in combination with XXService. Thus, as indicated in results 401, because the weighting component 125 knows that the First-Example-Role has already been granted access to AAservice, and because the weighting component 125 also knows that AAService is frequently used in combination with XXService, the weighting component 125 chooses to assign higher weights to policies associated with XXService than to other policies.

In one specific example, AAService could be an object storage service, while XXService could be a data archiving service that is frequently used together with the object storage service. In some examples, both AAService and XXSevice may be provided by the same vendor, such as computing services vendor 149. In some examples, computing services vendor 149 may provide several computing services and may analyze usage patterns for the computing services to determine which of the computing services are frequently used in combination with one another. In some examples, usage data that shows service usage information (e.g., usage dates, times, durations, etc.) by customers of computing services vendor 149 may be provided as input to a machine learning process. The machine learning process may then analyze the usage data to determine which services are frequently used in combination with one another or are otherwise related to one another.

Referring now to FIG. 4, another example is shown in which a user has requested a policy search in order to find and select a policy for attachment to the First-Example-Role identity, as indicated by identity information 201 of FIG. 4. In this example, the weighting component 125 receives related identity information 201, which indicates that another identity, named Second-Example-Role, is included in the same customer account as First-Example-Role. The weighting component 125 may therefore determine that First-Example-Role and Second-Example-Role are related identities. Additionally, existing attached policy information 202 of FIG. 4 indicates that a policy named XXServiceFullAccess has been attached to Second-Example-Role. Thus, as indicated in results 501, because the weighting component 125 knows that a policy associated with XXService has been assigned to Second-Example-Role (which is related to First-Example-Role), the weighting component 125 may, for First-Example-Role, choose to assign a higher weight to policies associated with XXService than to other policies.

Figure 5:
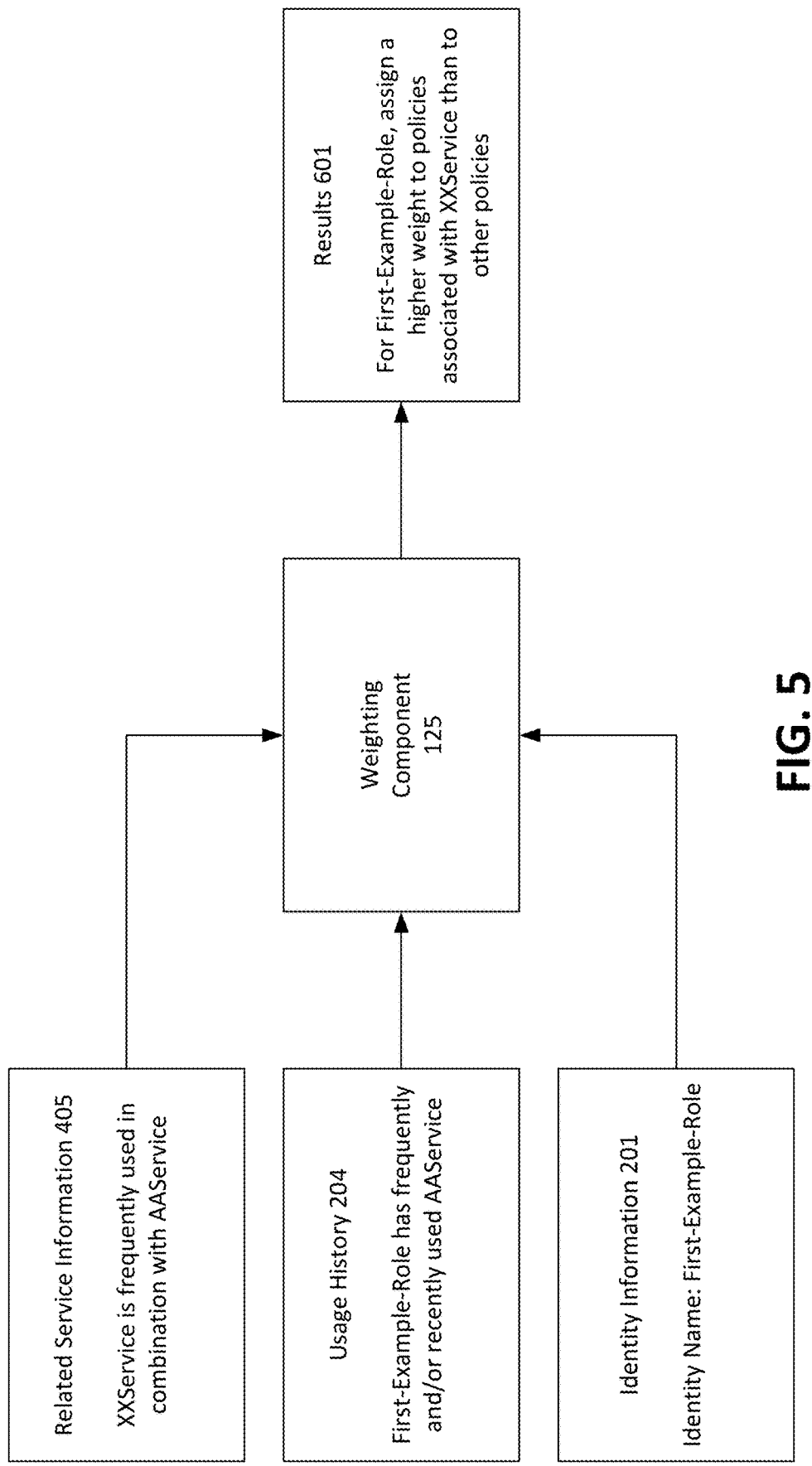
FIG. 5 is a diagram illustrating a fourth example policy weighting based on usage history that may be used in accordance with the present disclosure.

Referring now to FIG. 5, another example is shown in which the weighting of policy names is performed on based on a usage history of an identity. In the example of FIG. 5, a user has requested a policy search in order to find and select a policy for attachment to the First-Example-Role identity, as indicated by identity information 201 of FIG. 5. In this example, the weighting component 125 receives usage history 204, which indicates that First-Example-Role has frequently and/or recently accessed AAService. Additionally, in the example of FIG. 5, the weighting component 125 also receives related service information 405, which indicates that AAService is frequently used in combination with XXService. Thus, as indicated in results 601, because the weighting component 125 knows that First-Example-Role has frequently and/or recently accessed to AAservice, and because the weighting component 125 also knows that AAService is frequently used in combination with XXService, the weighting component 125 assigns higher weights to policies associated with XXService than to other policies.

Referring back to FIG. 1, it is shown that the context information 126 may also include interface browsing history 205. For example, in some cases, the weighting component 125 may track pages loaded, and other activities, performed within interface 151 (e.g., a web console) by a user and/or by multiple users within a same account. The weighting component 125 may then use this interface browsing history 205 to assist in weighting of policies. For example, if the weighting component 125 determined that a user has frequently and/or recently used the interface 151 to load pages pertaining to YYService, then the weighting component 125 may choose to assign a higher weight to policies associated with YYService than to other policies.

Figure 6:
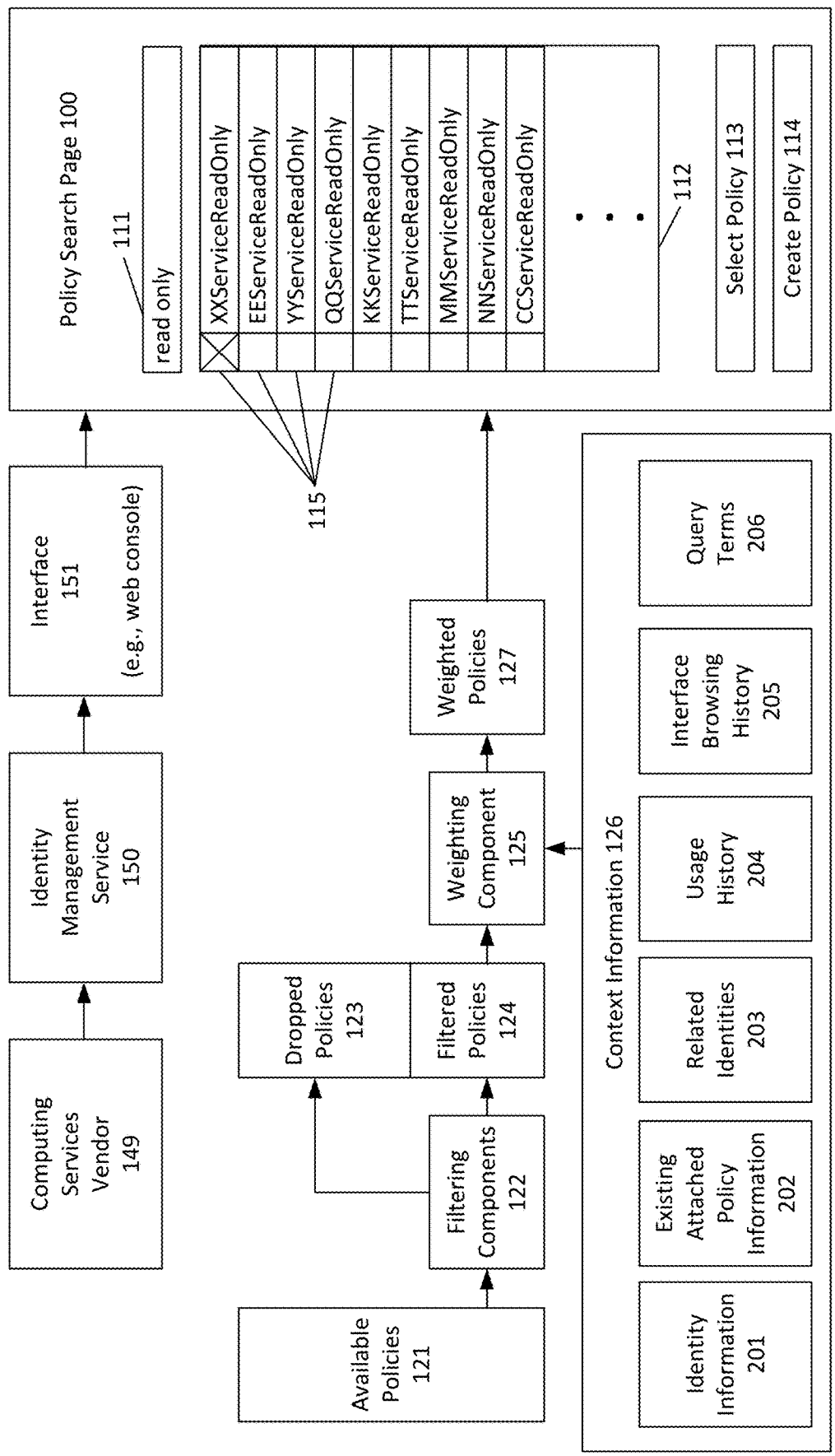
FIG. 6 is a diagram illustrating an example weighted policy search system with result filtering that may be used in accordance with the present disclosure.

Referring back to FIG. 1, it is shown that the user has not typed any query search terms into text entry field 111. Nevertheless, using examples such as those shown in FIGS. 2-5 and described above, the techniques described herein allow weighting and ordering of policies in the policy listing even before (or without) the user entering any explicit query terms into the text entry field 111. For example, as shown in FIG. 1, policies for XXService are ranked at the top of the list based on the context information 126, such as by using the weighting and ordering techniques described above. In some examples, however, the weighting techniques described herein may be used in combination with filtering techniques, such as filtering based on query term matches. For example, referring now to FIG. 6, an example is shown in which a user types the search terms "read" and "only" into text entry field 111. In response to these query terms, the search results may be filtered to remove all policies that do not include at least one of these terms. As shown in FIG. 6, all of the policies listed in display area 112 now include the terms "ReadOnly". This is in contrast to FIG. 1, in which the display area 112 included several policies that did not include the terms "ReadOnly" (e.g., XXServiceFullAccess, XXServiceWrite, etc.). It is noted, however, that, although the policies listed in FIG. 6 are filtered such that they all include the terms "ReadOnly", the policies are still nevertheless weighted and ordered using the techniques described herein. For example, as shown in FIG. 6, a policy associated with XXService (i.e., XXService ReadOnly) is still the top listed policy. This is because policies associated with XXService are determined to have the highest relevance to the search based on context information 126.

In the example of FIG. 6, filtering components 122 are employed to filter the available policies 121 based on query terms. Specifically, the filtering components 122 filter-out policies that do not include the query terms "read" or "only". The policy names that do not match the query terms "read" or "only" are filtered-out into dropped policies 123. The dropped policies 123 are not weighted and are not displayed in display area 112 of FIG. 6. By contrast, the policy names that do match the query terms "read" or "only" are retained in filtered policies 124. The weighting component 125 then performs the weighting and ordering techniques described herein on the filtered policies 124, and these results are shown in display area 112 of FIG. 6.

In some examples, in addition to being used for filtering purposes, the query terms entered into text entry field 111 may also be considered part of the context information 126 and may be used for policy weighting and ordering. For example, weighting components 125 may be configured to assign higher weights to certain query terms than to other query terms. In some cases, higher weights may be assigned to query terms that indicate more specific services or resources, while lower weights may be assigned to query terms that correspond to more general entities. As a specific example, computing services vendor 149 of FIG. 1 may operate a number of computing services. In some cases, higher weights may be given to query terms that correlate to a specific service, while lower weights may be given to query terms that correlate to only the name of the computing services vendor 149 itself. As shown in FIGS. 1 and 6, query terms 206 are included in context information 126. This indicates that the query terms 206 may be considered for weighting and ordering purposes. Additionally, in some examples, even policy names that do not match to an entered query term may not be filtered out—but may instead be assigned a lower weight than other policy names that do match an entered query term. For example, in some cases, policy names that do not match to an entered query term may be positioned at the end or bottom of a scrollable list.

In some examples, the calculation of weights for different policies may be performed based at least in part on a modified version of a ranking function, such as Okapi Best Matching (BM) 25, a Jaccard index, or another ranking function. For example, while these and other ranking functions may sometimes be employed to find relevance of a document to query terms, a modified version of the ranking functions may be employed to find relevance of a policy to query terms. Additionally, in some examples, in addition or as an alternative to an explicit query including search terms manually entered by the user (e.g., via text entry field 111 of FIGS. 1 and 6), a virtual query may be created based on context information not explicitly entered by the user as a search term, such as identity information, existing attached policy information, related identities (e.g., other identities within the same account), usage history, and interface browsing history. This virtual query may then be run through one or more of the modified ranking functions described above. In yet another example, both virtual query terms (e.g., created based on context information not explicitly entered by the user as a search term) and explicit query terms (e.g., manually entered by the user) may be run through the modified ranking function and may be potentially assigned different weights, such as based on which type of information is considered more indicative of the user's search intent.

Thus, the techniques described above may assist a user in finding available policies that are contextually relevant. In some cases, however, there may not be any existing available policies that match a user's priorities. In these examples, the user may need to create a new policy that matches the user's priorities. In some conventional techniques, a user may create a new policy by manually selecting features of the new policy, such as a service, actions (e.g., fill access, read, write, list, etc.), resources, conditions, and the like. However, one problem with these conventional techniques is that there may be limited association between a user's policy search activities and a user's subsequent policy creation activities. For example, consider a scenario in which a user searches for a policy, such as by entering multiple different search query terms. Now suppose that the policy for which the user searches does not yet exist, and the user is therefore unable to locate the policy during the search. In some cases, after performing an unsuccessful search to attempt to locate the policy, the user may then navigate to a new policy creation interface and attempt to create the new policy. In some conventional techniques, however, the user may be required to start from scratch when creating the new policy, such as by manually entering all the features of the new policy into the interface. This may be frustrating to the user, for example because the user has already invested time and effort in performing the search and may now be forced to repeat the entry of certain information in order to create the new policy.

In order to alleviate these and other problems, the techniques described herein may provide a policy creation interface that uses context information from the user's search in order to infer and pre-populate one or more suggested features of the new policy within the interface. Referring now to FIG. 7, an example of a policy creation interface 800 with inferred feature suggestions will now be described in detail. As shown in FIG. 7, policy creation interface 800 includes services section 810, actions section 820, resources section 830 and conditions section 840. Services section 810 allows selection of services for the new policy. Actions section 820 allows selection of actions for the new policy. Resources section 830 allows selection of resources for the new policy. Conditions section 840 allows selection of conditions for the new policy.

In the example of FIG. 7, services section 810, actions section 820, resources sections 830, and conditions section 840 include suggestions made by the software that are inferred based on a context of a prior policy search. Specifically, services section 810 includes suggested service 811 (WWService), which is inferred by the software based on the context of the prior policy search and pre-populated into the policy creation interface 800 by the software without being manually entered by the user into the policy creation interface 800. In some examples, if the user wishes to change the suggested service 811 to a different service, then the user may select edit button 812. Additionally, actions section 820 includes suggested action 821 (Read Only), which is inferred by the software based on the context of the prior policy search and pre-populated into the policy creation interface 800 by the software without being manually entered by the user into the policy creation interface 800. In some examples, if the user wishes to change the suggested action 821 to a different action, then the user may select edit button 822. Additionally, resources section 830 includes suggested resource 831 (MyBucketBBB), which is inferred by the software based on the context of the prior policy search and pre-populated into the policy creation interface 800 by the software without being manually entered by the user into the policy creation interface 800. In some examples, if the user wishes to change the suggested resource 831 to a different resource, then the user may select edit button 832. Furthermore, conditions section 840 includes suggested condition 841 (ConditionCCC), which is inferred by the software based on the context of the prior policy search and pre-populated into the policy creation interface 800 by the software without being manually entered by the user into the policy creation interface 800. In some examples, if the user wishes to delete and/or change the suggested condition 841 to a different condition, then the user may select edit button 842.

In some examples, after performing a policy search using policy search page 100 of FIGS. 1 and 6, the user may navigate to the policy creation interface 800 by selecting create policy button 114 of FIGS. 1 and 6. Selection of the create policy button 114 may cause the policy creation interface 800 to be pre-populated with suggested information that is inferred from the prior search, such as suggested service 811 and suggested action 821. The suggested service 811 and the suggested action 821 may be selected by the software based on any, or all, of the context information 126 described above, including identity information 201, existing attached policy information 202, related identities 203, usage history 204, interface browsing history 205, and query terms 206. For example, consider a scenario in which a user attempts to search for a policy for WWService, with a ReadOnly action, for the resource MyBucketBBB, with ConditionCCC. Now suppose that a policy with these features does not yet exist. In this example, the user may enter search terms such as "WWSerivce" and "read only" and "MyBucketBBB" and "ConditionCCC" into text entry field 111 of FIGS. 1 and 6. However, the policy that the user is searching for will not be provided in the list of policies in display area 112 if it does not yet exist. In this case, once the user sees that the policy that he or she is searching for has not been returned as a search result, the user may select the create policy button 114 to navigate to policy creation interface 800. In the policy creation interface 800, the search query terms previously entered by the user may be employed by the software to select WWService as the suggested service 811, to select Read Only as the suggested action 821, to select MyBucketBBB as the suggested resource 831, and to select ConditionCCC as the selected condition 841.

In some examples, one or more query analysis components may be trained to analyze query terms and match the query terms to features of a policy, such as a service, an action, a resource, and/or a condition. For example, in some cases, a query analysis component may be provided with (or otherwise determine) a list of services operated by computing services vendor 149, and the query analysis component may attempt to match search terms entered by the user to one or more of these services. When a query term matches a service name, the query analysis components may then suggest this service as a suggested service 811 in the policy creation interface 800. The query analysis components may also be provided with (or otherwise determine) a list of actions, and the query analysis component may attempt to match search terms entered by the user to one or more of these actions. When a query term matches an action name, the query analysis components may then suggest this action as a suggested action 821 in the policy creation interface 800. The query analysis components may also be provided with (or otherwise determine) a list of common terms for resources (e.g., bucket, table, etc.), and the query analysis component may attempt to match search terms entered by the user to one or more of these common resource terms. When a query term matches a common resource term, the query analysis components may then suggest this query term as a suggested resource 831 in the policy creation interface 800. The query analysis components may also be provided with (or otherwise determine) a list of common condition terms, and the query analysis component may attempt to match search terms entered by the user to one or more of these common condition terms. When a query term matches a common condition term, the query analysis components may then suggest this query term as a suggested condition 841 in the policy creation interface 800.

In some examples, policy creation interface 800 may be employed to perform a copy and modify technique. In these examples, the suggestions that are pre-populated into policy creation interface 800 may correspond to features of a pre-existing policy, such as a policy that is a top listed search result from the policy search page 100. The copy and modify technique may be advantageous for scenarios when there is an existing policy that matches some (but not all) of the criteria that the user desires. In yet other examples, a hybrid technique may be employed, such as when some suggested policy features are extracted from an already existing policy, while other suggested policy features may be determined based on query terms or other context information. Thus, the software may select suggested features of the policy creation interface 800 based on one or more types of context information 126 including the example weighting techniques of FIGS. 2-5 and other weighting techniques described above.

Figure 8:
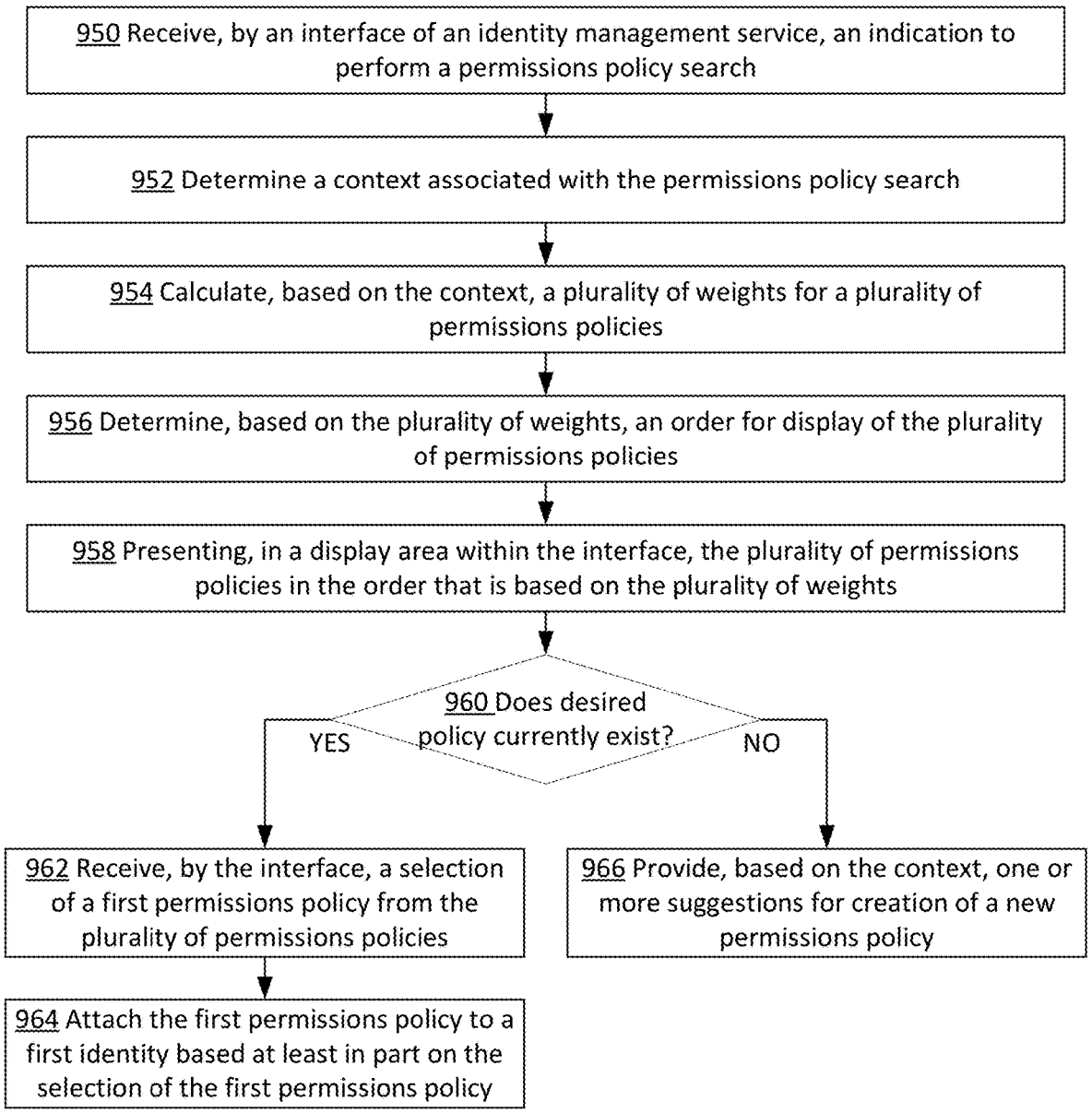
FIG. 8 is a flowchart illustrating an example weighted policy searching process that may be used in accordance with the present disclosure.

FIG. 8 is a flowchart illustrating an example weighted policy searching process that may be used in accordance with the present disclosure. The process of FIG. 8 is initiated at operation 950, at which an indication to perform a permissions policy search is received by an interface (e.g., web console interface) of an identity management service. In some examples, the indication may include a request from a user to navigate to a policy search page, such as policy search page 100 of FIGS. 1 and 6. Additionally, in some examples, prior to navigating to the policy search page, a user may select a first identity for which to perform the permission policy search, such as to find a first permissions policy to attach to the first identity.

At operation 952, a context associated with the permissions policy search is determined. For example, the context may be determined based on context information, which may include identity information, existing attached policy information, related identities, usage history, interface browsing history, query terms, and other information. For example, the identity information may include identity information (e.g., identity name, identity age, etc.) for the first identity for which the permissions policy search is being performed. The existing attached policy information may include information about existing attached policies that have already been attached to the first identity and/or to other identities that are related to the first identity. The related identities may include information about identities that are related to the first identity, such as other identities within a same customer account as the first identity. Usage history may include usage history for the first identity and/or related identities. Interface browsing history may include a user's browsing history within the identity management service interface (e.g., web console). Query terms may include one or more query search terms entered by a user.

At operation 954, a plurality of weights for a plurality of permissions policies are calculated based on the context. In some examples, the calculation may include determining that the context indicates a first service. The calculation may also include determining one or more first permissions policies of the plurality of permissions policies that are associated with the first service. The calculation may also include assigning a higher weight to the one or more first permissions policies than to other permissions policies of the plurality of permissions policies. In some cases, a corresponding respective weight may be calculated and assigned to each entity of the plurality of entities. In some examples, the calculation of weights may be performed based at least in part on a modified version of a ranking function, such as Okapi Best Matching (BM) 25, a Jaccard index, or another ranking function. For example, while these and other ranking functions may sometimes be employed to find relevance of a document to query terms, a modified version of the ranking functions may be employed to find relevance of a policy to query terms. Additionally, in some examples, in addition or as an alternative to an explicit query including search terms manually entered by the user (e.g., via text entry field 111 of FIGS. 1 and 6), a virtual query may be created based on context information not explicitly entered by the user as a search term, such as identity information, existing attached policy information, related identities (e.g., other identities within the same account), usage history, and interface browsing history. This virtual query may then be run through one or more of the modified ranking functions described above. In yet another example, both virtual query terms (e.g., created based on context information not explicitly entered by the user as a search term) and explicit query terms (e.g., manually entered by the user) may be run through the modified ranking function and may be potentially assigned different weights, such as based on which type of information is considered more indicative of the user's search intent.

In one specific example, the context may include a name of a first identity for which the permissions policy search is being performed, and the plurality of weights may be calculated based at least in part on the name. Additionally, in one specific example, the context may include or more existing permissions policies that are attached to the first identity for which the permissions policy search is being performed, and the plurality of weights may be calculated based at least in part on the one or more existing permissions policies. Furthermore, in one specific example, the context may include one or more existing permissions policies that are attached to a second identity that is related to the first identity, and the plurality of weights may be calculated based at least in part on the one or more existing permissions policies. In yet another specific example, the context may include a resource usage history of the first identity, and the plurality of weights may be calculated based at least in part on the resource usage history. In yet another specific example, the context may include an interface browsing history, and the plurality of weights may be calculated based at least in part on the interface browsing history.

At operation 956, an order for display of the plurality of permissions policies may be determined based on the plurality of weights. A policy's position in an ordered list may be determined based on its respective weight (e.g., rank), for example such that higher weighted policies are displayed with a higher priority (e.g., higher up in the list), while lower weighted policies are displayed with a lower priority (e.g., further down in the list). For example, a highest weighted policy may be assigned the highest priority in an order, such as being positioned at the top of an ordered list. A second-highest weighted policy may be assigned a second-highest priority in an order, such as being positioned second from the top of the ordered list. This ordering process may continue until the lowest weighted policy is assigned a lowest priority in the order, such as being positioned at the bottom of the ordered list. At operation 958, the plurality of permissions policies are presented (e.g., displayed), in a display area within the interface, in the order that is based on the plurality of weights. For example, as shown in FIGS. 1 and 6, the weighted permissions policies are displayed in display area 112 of policy search page 100, such as in a scrollable list of permissions policies. The display area 112 includes checkboxes 115 to the left of each permissions policy that may be selected by a user in order to select the corresponding respective permissions policy.

At operation 960, it is determined whether the policy for which the user is searching currently exists. For example, if the policy is included in the search results, then the user may determine that the policy exists. By contrast, if the user is unable to find the policy within the search results, then the user may determine that the policy does not yet exist. If the policy exists, then, at operation 962, the interface receives a selection of a first permissions policy from the plurality of permissions policies. For example, the user may select the first permission policy by checking the respective checkbox to the left of the first permissions policy. The user may then click select policy button 113 to cause all policies that have been selected by the user within the display area 112 (e.g., all policies whose checkboxes are selected) to be selected. At operation 964, the first permissions policy is attached to a first identity based at least in part on the selection of the first permissions policy. For example, in some cases, prior to performing the permissions policy search, the user may select the first identity to which the selected policy will be attached. In this example, clicking of select policy button 113 may cause the software to attach each selected policy to the first identity. In other examples, the user may click select policy button and may then subsequently select the first identity to which the selected policy will be attached.

By contrast, if the policy for which the user is searching does not currently exist, then, at operation 966, one or more suggestions for creation of a new permissions policy are provided based at least in part on the context. In some examples, the one or more suggestions may include suggested features, such as a suggested service, a suggested action, a suggested resource and/or a suggested condition. For example, in some cases, if the user cannot find the policy for which he or she is searching, the user may click create policy button 114 of FIGS. 1 and 6, which may cause policy creation interface 800 of FIG. 7 to be displayed. The policy creation interface may include a suggested service, a suggested action, a suggested resource, a suggested condition and/or other suggested features for the new policy that is being created. These suggested features may be inferred by the software based on the context information and the weighting techniques described above.

Techniques for permissions searching by scenario are also described herein. As described above, an identity management service may provide an interface, such as a web console interface, that allows a user to select a given identity and to search for permissions to attach to the given identity. In some examples, however, a user may be working in a different interface, such as a command line interface (CLI) or other programmatic interface, that is external to the web console interface. In some cases, a user's interactions with the programmatic interface may cause the user to add or otherwise modify permissions. For example, consider a scenario in which a user is logged into a CLI using a given identity named My-Example-Role. Now suppose that the user calls a Get Object operation that attempts to read data from a resource from which the My-Example-Role identity is not authorized to read data. In this scenario, the operation may fail, and the CLI may return an error message indicating that the operation has failed because access to the resource is denied. In some examples, this scenario may cause the user to attach a new permission to the My-Example-Role identity that will grant read access to the resource.

One problem with the above described scenario is that, in some conventional systems, the user may be required to manually perform several time-consuming actions in order to attach the new permission to the My-Example-Role identity. For example, the user may be required to manually navigate to an identity management service dashboard of a web console interface, manually select the My-Example-Role identity with which the user was working in the CLI, and then manually navigate to a policy search page for the My-Example-Role identity. Moreover, once the user manually navigates to the policy search page, the user may be required to manually conduct a search in order to find a policy that includes the necessary permissions, such as by manually selecting and entering relevant search terms. Customers may often be frustrated by having to manually navigate to the search interface, which may require several time-consuming steps such as those described above. Customers may also be frustrated with the process of having to repeatedly provide context for the search (e.g., identity name, service name, action, etc.), when this context was already available from the CLI in which the user was previously working.

To help alleviate these and other problems, the techniques described herein may allow context from a programmatic interface, such as a CLI, to be used to automatically select, generate and launch a resolution interface, such as a permissions search interface for selecting and attaching permissions to an identity. For example, in the techniques described herein, a context component may obtain scenario-based context information associated with an error corresponding to an operation called from a programmatic interface. In some examples, the context component may obtain the scenario-based context information from logs, access keys, information from configuration files and environment variables, and other information sources associated with the programmatic interface. The scenario-based context information may include, for example, identity information regarding the identity that operates the programmatic interface, interface type information that indicates a type of programmatic interface in which the error occurs (e.g., CLI, template, etc.), operation information regarding the operation (e.g., associated service, operation type, resources and other parameters, etc.), result information (e.g., error type, etc.), and other related information.

The scenario-based context information may then be used to generate a resolution interface. For example, in the denial of access scenario described above, the result information may indicate that calling of the Get Object operation results in a denial of access error. Based on the denial of access error, the context component may select to launch a permissions search interface, for example in the web console interface. Additionally, the identity information may indicate that the user was logged into the CLI using the My-Example-Role identity. Based on this identity information, the context component may determine to launch the permissions search interface on a console page that corresponds to the My-Example-Role identity. The context component may then automatically launch the permissions search interface on the My-Example-Role identity page in the web console interface. Furthermore, the operation information may include information that may be used to generate one or more search terms. For example, the operation information may indicate a particular service with which operation is associated, and the context component may generate a search term corresponding to the name of the service. As another example, the operation information may indicate an operation type (e.g., Get Object) of the operation, and the context component may generate a search term corresponding to the operation type. For example, the context component may determine that the Get Object operation is associated with read access, and the context component may therefore select search terms such as read. A search may then be performed based on the generated search terms. The user may then select, based on the results of the search, a policy for attachment to the My-Example-Role identity. The selected policy, once attached to the My-Example-Role identity, may allow the Get Object operation to be performed successfully.

In the above example, it is assumed that the access is denied because a necessary security policy has not yet been attached to the My-Example-Role identity. In some examples, however, security policies may need to be configured for both an identity and a resource, such as for cross account resource access, for accessing of keys of services that perform key management, and for other reasons. For example, for cross account access (e.g., when an identity in a first account attempts to access to a resource in a second account), access permissions may need to be configured for both the identity and the resource. Furthermore, when accessing a key of a service that performs key management, access permissions may also need to be configured for both the identity and the key/resource, even in cases in which the identity and the key/resource are in the same account.

In some examples, the context component may determine whether the operation relates to a scenario in which permissions for both the identity and the resource are necessary, such as a cross account access or an access of a key of a service that performs key management. If so, then the context component may evaluate both the identity's existing security policies and the resource's existing attached security policies. If the identity's existing security policies do not allow necessary access to the resource, then the context component may use the scenario-based context information to generate a permissions search interface for the identity (as in the example above). Additionally or alternatively, if the resource's existing security policies do not allow necessary access to the identity, then the context component may use the scenario-based context information to generate a permissions search interface for the resource. Thus, in some examples, the context component may launch multiple search interfaces, including both a search interface for identity and a search interface for the resource.

While the above examples relate to an operation called from a CLI, the techniques described herein may also be employed in other programmatic interfaces. For example, the techniques described herein may be employed to assist in resolving denied access and other errors associated with templates, such as resource declaration templates. Scenario-based context information that is associated with the template-based scenario may be obtained, such as to determine the relevant identity, relevant permission information, and the like. In some examples, templates may be used to manage and control identity permissions. In these instances, instead of launching a permissions search interface in a web console, the context component may instead launch a permissions search interface within the template. In some examples, the context component may select an appropriate resolution interface location (e.g., web console, template, etc.) based on the programmatic interface in which the error occurs, which may be indicated by the scenario-based context information. In yet other examples, the scenario-based context information may be used in association with development interfaces, for example to perform static analysis on code. The static analysis may be employed to determine which operations may result in errors without forcing the user to execute the program. Scenario-based context information may be obtained that is associated with errors identified by the static analysis, and the context component may automatically launch, using the scenario-based context information, an appropriate resolution interface to assist in resolving the errors.

Figure 9:
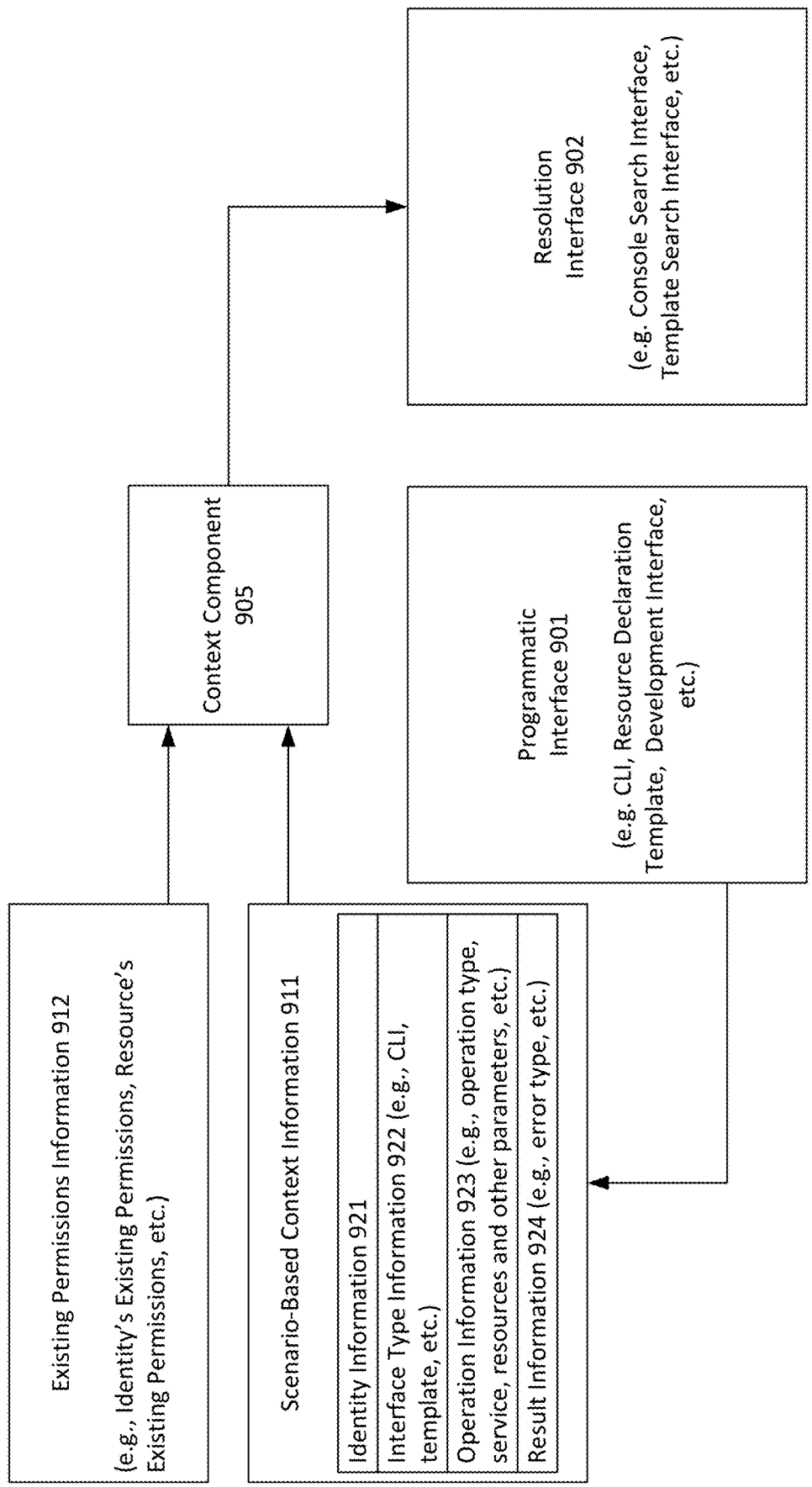
FIG. 9 is a diagram illustrating an example scenario-based permissions search system that may be used in accordance with the present disclosure.

FIG. 9 is a diagram illustrating an example scenario-based permissions search system that may be used in accordance with the present disclosure. As shown in FIG. 9, a user may operate a programmatic interface 901, such as a CLI, a resource declaration template, a development interface, and the like. The user may operate the programmatic interface using an identity, such as a role. For example, the user may provide authentication information for the identity that allows the user to control the programmatic interface 901 on behalf of the identity. In some examples, an operation, such as an application programming interface (API) call, may be called from the programmatic interface. Also, in some examples, an error may occur as a result of calling the operation. For example, if the operation attempts to access a resource that the identity is not authorized to access, then an error may occur.

When an error occurs in programmatic interface 901, a context component 905 may launch a resolution interface 902 that assists in resolving the error. The resolution interface 902 may include, for example, a console permissions search interface, a template permissions search interface, or another interface that assists in resolving the error. For example, the context component 905 may obtain scenario-based context information 911 associated with an error corresponding to an operation called from programmatic interface 901. The scenario-based context information 911 may include, for example, identity information 921 regarding the identity that operates the programmatic interface 901, interface type information 922 that indicates a type of the programmatic interface 901 in which the error occurs (e.g., CLI, template, etc.), operation information 923 regarding the operation (e.g., associated service, operation type, resources and other parameters, etc.), result information 924 indicating a result (e.g., error type, etc.) of the operation, and other related information. In some examples, the context component 905 may obtain the scenario-based context information 911 from logs, access keys, configuration files, environment variables, and other information sources associated with the programmatic interface. For example, logs associated with the programmatic interface 901 may include metadata that includes any, or all, of the above described information. As another example, access keys, which may be used to authenticate the operator of the programmatic interface 901, may be used to determine the identity information 921.

In addition to scenario-based context information 911, the context component 905 may also obtain existing permissions information 912. The existing permissions information 912 may be obtained from an identity management service as well as other permissions management services. The existing permissions information 912 may include for example, information about existing permissions that are currently assigned to the identity that operates the programmatic interface 901. The existing permissions information 912 may also include, for example, information about existing permissions that are currently assigned to a resource that the identity attempts to access.

The context component 905 may then use the scenario-based context information 911, the existing permissions information 912, and optionally other information to select, generate and launch resolution interface 902. For example, the context component 905 may use result information 924 from the scenario-based context information 911 to determine a type of resolution interface 902 that needs to be generated. As an example, an error for denied access may indicate that one or more permissions search interfaces should be generated, such as to allow searching for permissions that will allow access. In some examples, the context component 905 may access stored information that maps certain types of errors or other results to respective types of resolution interfaces. As another example, the context component 905 may also use interface type information 922 from the from the scenario-based context information 911 to determine a type of resolution interface 902 that needs to be generated. For example, if the error occurred in a resource declaration template, then the context component 905 may launch a permissions search interface in the template. By contrast, if the error occurred in a CLI, then the context component 905 may launch a permissions search interface in a web console. In some examples, the context component 905 may access stored information that maps certain programmatic interfaces types to respective resolution interface types. As another example, the context component 905 may use identity information 921 from the scenario-based context information 911 to determine a page of a web console interface on which to launch the permissions search interface, such as a page corresponding to the authenticated identity. As another example, the operation information 923 from the scenario-based context information 911 may include information that may be used to generate one or more search terms. For example, the operation information 923 may indicate a particular service with which the operation is associated, and the context component 905 may generate a search term corresponding to the name of the service. As another example, the operation information 923 may indicate an operation type of the operation, and the context component 905 may generate a search term corresponding to the operation type.

In some examples, the context component 905 may determine whether the operation relates to a scenario in which permissions for both the identity and the resource are necessary, such as a cross account resource access or an access of a key of a service that performs key management. If so, then the context component 905 may use existing permissions information 912 to evaluate both the identity's existing security policies and the resource's existing security policies. If the identity's existing security policies do not allow necessary access to the resource, then the context component 905 may use the scenario-based context information 911 to generate a permissions search interface for the identity. Additionally or alternatively, if the resource's existing security policies do not allow necessary access to the identity, then the context component 905 may use the scenario-based context information 911 to generate a permissions search interface for the resource. Thus, in some examples, the context component 905 may launch multiple search interfaces, including both a search interface for identity and a search interface for the resource.

Figure 10:
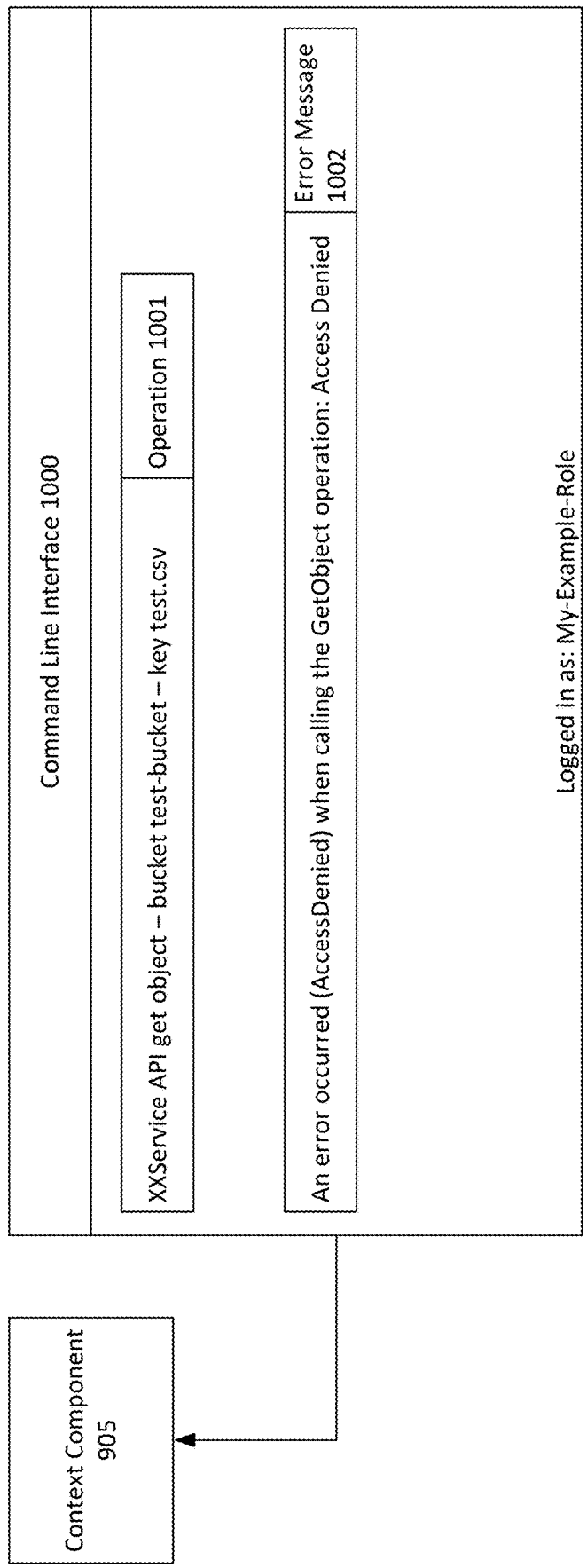
FIG. 10 is a diagram illustrating an example denial of access error in a command line interface (CLI) that may be used in accordance with the present disclosure.

Some specific examples of how context component 905 may select, generate and launch a resolution interface 902 will now be described in detail. Referring now to FIG. 10, an example is shown in which a denial of access error occurs in a command line interface 1000. In the example of FIG. 10, a user is logged into the command line interface 1000 using the My-Example-Role identity. While working in the command line interface 1000, the user calls an operation 1001. As shown, the operation 1001 is an API call for XXService to perform a Get Object operation type. Specifically, the operation 1001 requests the key test.csv from a bucket named test-bucket. As a result of calling operation 1001, an error message 1002 is displayed in the command line interface 1000. Specifically, the error message 1002 indicates that an access denied error occurred when calling operation 1001.

Figure 11:
FIG. 11 is a diagram illustrating example scenario-based context information that may be used in accordance with the present disclosure.

Referring now to FIG. 11, scenario-based context information 911A is a specific example instance of scenario-based context information 911 of FIG. 9. Specifically, scenario-based context information 911A is a specific example that corresponds to the denial of access error depicted in FIG. 10. For example, the scenario-based context information 911A includes identity information 921A, which indicates that My-Example-Role is the identity that is operating the command line interface 1000. The scenario-based context information 911A also includes interface type information 922A indicating that the error of FIG. 10 occurred in an interface having a CLI interface type. The scenario-based context information 911A also includes operation information 923A indicating that operation 1001 has an operation type of Get Object. Operation information 923A further indicates that operation 1001 is for a service named XXService. Operation information 923A further indicates that operation 1001 attempts to access a resource named test-bucket. The scenario-based context information 911 also includes result information 924A, which indicates that the result of operation 1001 is an error of type access denied. In some examples, the information indicated in identity information 921A, interface type information 922A, operation information 923A, and result information 924 may be stored as name value pairs or using any other suitable data format.

The context component 905 may use the scenario-based context information 911A to generate a resolution interface 902. For example, the context component 905 may determine, based on the error type (denial of access) indicated in result information 924A, that a permissions search interface is the appropriate type of resolution interface 902. As described above, in some examples, the context component 905 may access stored information that maps certain types of errors or other results to respective types of resolution interfaces. The context component 905 may also determine, based on the interface type (CLI) indicated in interface type information 922A, to launch a permissions search interface in a web console. As described above, in some examples, the context component 905 may access stored information that maps certain types of programmatic interfaces to respective types of resolution interfaces. The context component 905 may also determine, based on the identity (My-Example-Role) indicated in identity information 921A, to launch the permissions search interface on a web console page corresponding to the My-Example-Role identity.

Figure 12:
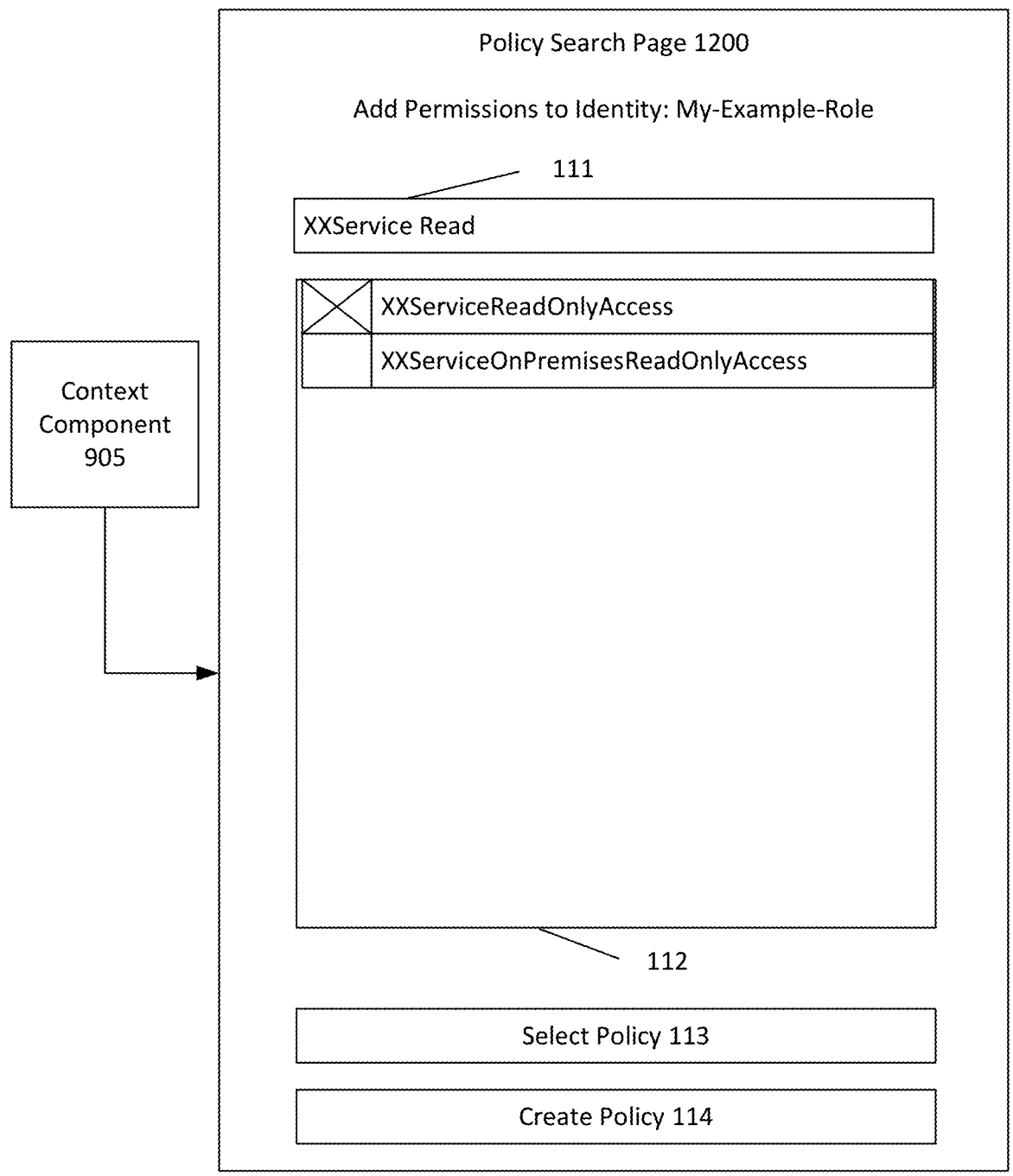
FIG. 12 is a diagram illustrating an example policy search page generated based on scenario-based context information that may be used in accordance with the present disclosure.

Referring now to FIG. 12, a policy search page 1200 that may be generated by context component 905 will now be described in detail. The policy search page 1200 is a permissions search interface that may be generated in the web console interface. The policy search page 1200 may be generated by context component 905 in response to the denial of access error depicted in FIG. 10. As shown in FIG. 12, the policy search page 1200 includes the text, "Add Permissions to Identity: My-Example-Role." This text indicates that policy search page 1200 corresponds to the My-Example-Role identity and is used to attach permissions to the My-Example-Role identity. In some examples, the policy search page 1200 may be launched automatically, for example without requiring the user to manually select the My-Example-Role identity in the web console and also without requiring the user to manually navigate to a policy search page for the My-Example-Role identity.

As also shown in FIG. 12, the context component 905 may also use the scenario-based context information 911A to generate search terms for the policy search page 1200. Specifically, operation information 923A indicates that operation 1001 is associated with a service named XXService (because operation 1001 was a command of the XXService API). Thus, in this example, the context component may infer that a policy associated with XXService may provide the necessary permissions that would allow operation 1001 to be performed successfully. Accordingly, in this example, the context component 905 generates XXService as a search term. As shown in FIG. 12, the context component 905 automatically inserts the search term XXService into text entry field 111.

Additionally, operation information 923A also indicates that operation 1001 is a Get Object operation. Thus, in this example, the context component may infer that operation 1001 is associated with read access (because read access may allow an object to be obtained from a resource). In some examples, the context component 905 may access stored information that maps certain operation types to certain respective access types. For example, as discussed above, a Get Object operation may correspond to read access. As another example, a Put operation may correspond to write access. As yet another example, operations such as Create Bucket and Delete Bucket may correspond to administrative access. In this example, based on a determination that the Get Object operation is associated with read access, the context component 905 generates Read as a search term. As shown in FIG. 12, the context component 905 automatically inserts the search term Read into text entry field 111.

As shown in FIG. 12, a permissions search is performed based on the search terms XXservice and Read that are inserted into text entry field 111. The search returns two results for two different policies. It is noted that the results of the permissions search may be weighted and ranked using any of the techniques described above with reference to FIGS. 1-8. In the example of FIG. 12, the user selects the first result, which is for the XXServiceReadOnlyAccess policy. The user may then click the select policy button 113 to cause the XXServiceReadOnly policy to be attached to the My-Example-Role identity. Attachment of the XXServiceReadOnly policy to the My-Example-Role identity may allow operation 1001 to be performed successfully (if re-attempted by the user).

Figure 13:
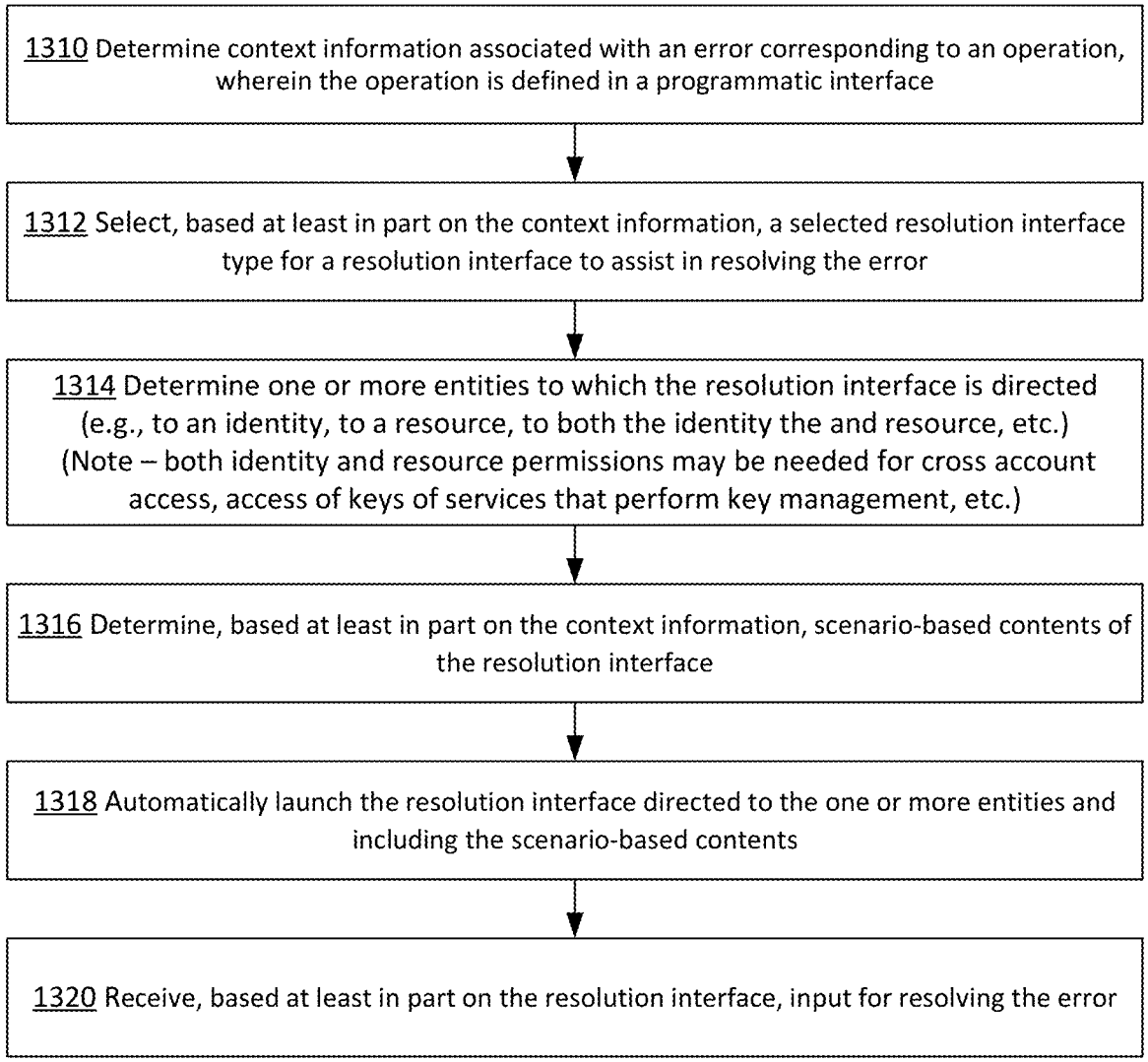
FIG. 13 is a flowchart illustrating an example scenario-based error resolution process that may be used in accordance with the present disclosure.

FIG. 13 is a flowchart illustrating an example scenario-based error resolution process that may be used in accordance with the present disclosure. The process of FIG. 13 is initiated at operation 1310, at which context information (e.g., scenario-based context information 911 of FIG. 9) associated with an error corresponding to an operation is obtained, wherein the operation is defined in a programmatic interface. As described above, in some examples, the context information may include identity information regarding an identity that operates the programmatic interface, interface type information that indicates a type of programmatic interface in which the error occurs (e.g., CLI, resource declaration template, development interface, etc.), operation information regarding the operation (e.g., associated service, operation type, resources and other parameters, etc.), and result information regarding a result of the operation (e.g., error type, etc.). In some examples, a context component may obtain the context information from logs, access keys, configuration files, environment variables, and other information sources associated with the programmatic interface. For example, logs associated with the programmatic interface may include metadata that includes any, or all, of the above described information. As another example, access keys, which may be used to authenticate the operator of the programmatic interface, may be used to determine the identity that operates the programmatic interface. Additionally, in some examples, the programmatic interface may be a development interface, and the context information may be determined as part of a static analysis on the development interface.

At operation 1312, a selected resolution interface type is selected for a resolution interface to assist in resolving the error. The selected resolution interface type is selected based at least in part on the context information. In some examples, the selected resolution interface may be selected based at least in part on the error type or other result information. As described above, in some examples, the context component may access stored information that maps certain types of errors or other results to respective types of resolution interfaces. As also described above, in some examples, the result information may indicate that the error is a denial of access error. In these cases, the selecting of the selected resolution interface type may include determining, based at least in part on the denial of access error, that the selected resolution interface type is a permissions search interface type. This is because permissions search interfaces may be used to find policies for attachment to an identity and/or resource that may provide permissions that are necessary to successfully execute the operation. It is noted, however, that permissions search interfaces may not necessarily be provided in all scenarios. For example, in some cases, it may be determined that a current authenticated user does not have the authority to add or change resource permissions for an identity and/or resource. In these scenarios, as opposed to a permissions search interface, a message or other interface may be provided indicating the entity (e.g., identity, resource, or both) whose permissions need to be modified and requesting that the permissions be modified by one or more different users (e.g., one or more administrators or other authorized users) that have the authority to do so. In some examples, such as in some cross account access scenarios, multiple administrators may be needed, such as an administrator for an identity and another administrator for the resource.

Operation 1312 may also include determining the resolution interface type based at least in part on which type of programmatic interface the error occurred in. This may be indicated by interface type information, which may be part of the scenario-based context information. For example, if the error occurred in a resource declaration template, then the context component may launch the resolution interface in the resource declaration template. By contrast, if the error occurred in a CLI, then the context component may launch the resolution interface in a web console interface. In some examples, the context component may access stored information that maps certain programmatic interfaces types to respective resolution interface types.

At operation 1314, one or more entities to which the resolution interface is directed are determined. For example, operation 1314 may include determining, based at least in part on existing permissions information, whether the resolution interface will be directed to the identity, to a resource accessed by the operation, or to both the identity and the resource. In some examples, the determining of the one or more entities to which the resolution interface is directed may be based at least in part on whether the operation requires a cross account resource access. For example, in some cases, context component may determine whether the operation relates to a scenario in which permissions for both the identity and the resource are necessary, such as a cross account resource access or an access of a key of a service that performs key management. If so, then the context component may use existing permissions information to evaluate both the identity's existing security policies and the resource's existing security policies. If the identity's existing security policies do not allow necessary access to the resource, then the context component may generate a permissions search interface (or other resolution interface) that is directed to the identity. Also, if the resource's existing security policies do not allow necessary access to the identity, then the context component may generate a permissions search interface (or other resolution interface) that is directed to the resource. If modification of both the identity's and the resource's permissions are required, then the context component may optionally generate two or more resolution interfaces (e.g., one search interface for the identity and another search interface for the resource) or a single resolution interface for both the identity and the resource (if such a resolution interface is supported). In other examples, the operation may relate to a scenario in which only permissions for the identity are necessary, such as when the identity attempts to access a standard resource within the same account as the identity. In these scenarios, it may only be necessary to generate a resolution interface that is directed to the identity.

In some examples, in addition or as an alternative to identity permissions and resource permissions, network permissions may also need to be added or otherwise modified. Thus, a network permissions configuration is another entity to which a resolution interface may be directed at operation 1314. For example, in some cases, an Internet Protocol (IP) address of an identity that calls an operation may be determined as part of the scenario-based context information. Also, in some cases, there may be a relevant network-based limitation, for example that only approved (e.g., whitelisted) IP addresses can access resources using a given service. In some examples, these network-based permissions may be configured as part of an identity's permissions or as part of a resource's permissions. However, in other examples, these network-based permissions may be configured separately from the identity and/or resource, such as via security groups or other entities or groups.

At operation 1316, scenario-based contents of the resolution interface are determined based at least in part on the context information. For example, the scenario-based contents may include search terms that are entered into a text input field (e.g., text entry field 111 of FIG. 12) and used to conduct a permissions search. Thus, in some examples, determining of the scenario-based contents may include generating, based at least in part on the operation information and/or other context information, one or more search terms. In some examples, the operation information may indicate a service associated with the operation, and the one or more search terms may include a name of the service. For example, as shown in FIG. 12, the search term XXService is generated in text entry field 111 because operation 1001 included an API call for XXService (as indicated in operation information 923A of FIG. 11). Also, in some examples, the operation information may indicate an operation type of the operation, and the one or more search terms may include an access type associated with the operation type. For example, as shown in FIG. 12, the search term Read is generated in text entry field 111 because operation 1001 was a Get Object operation (as indicated in operation information 923A of FIG. 11). In yet other examples, the scenario-based contents may be determined based in part, on additional information, such as tags that may be assigned to identities to control what the identities can access, tags that may be assigned to accessed resources to control access to the resources, and potentially other relevant tags or other information.

At operation 1318, the resolution interface directed to the one or more entities and including the scenario-based contents is automatically launched. For example, the context component may automatically launch an appropriate page in the web console interface or another type of resolution interface (e.g., resource declaration template, etc.). At operation 1320, input for resolving the error is received based at least in part on the resolution interface. For example, the receiving of the input for resolving the error may include receiving, via a permissions search interface, a selection of a first policy for attachment to the identity. The user may then select an attach policy button (or other control) to cause the policy to be attached to the identity or resource. In some examples, a user may be automatically guided to an appropriate portion or field of an interface for entering appropriate information. For example, when configuring permissions for a resource, assistance may be provided that may guide a user through the process of editing the resource policy. In some cases, suggested policies for the resource may be determined based on the scenario-based context information as described above, and a user may be automatically guided to an appropriate portion or field of a JavaScript Object Notation (JSON) or other formatted document at which the user may insert a clause indicating one of the suggested policies for configuring the resource.

Figure 14:
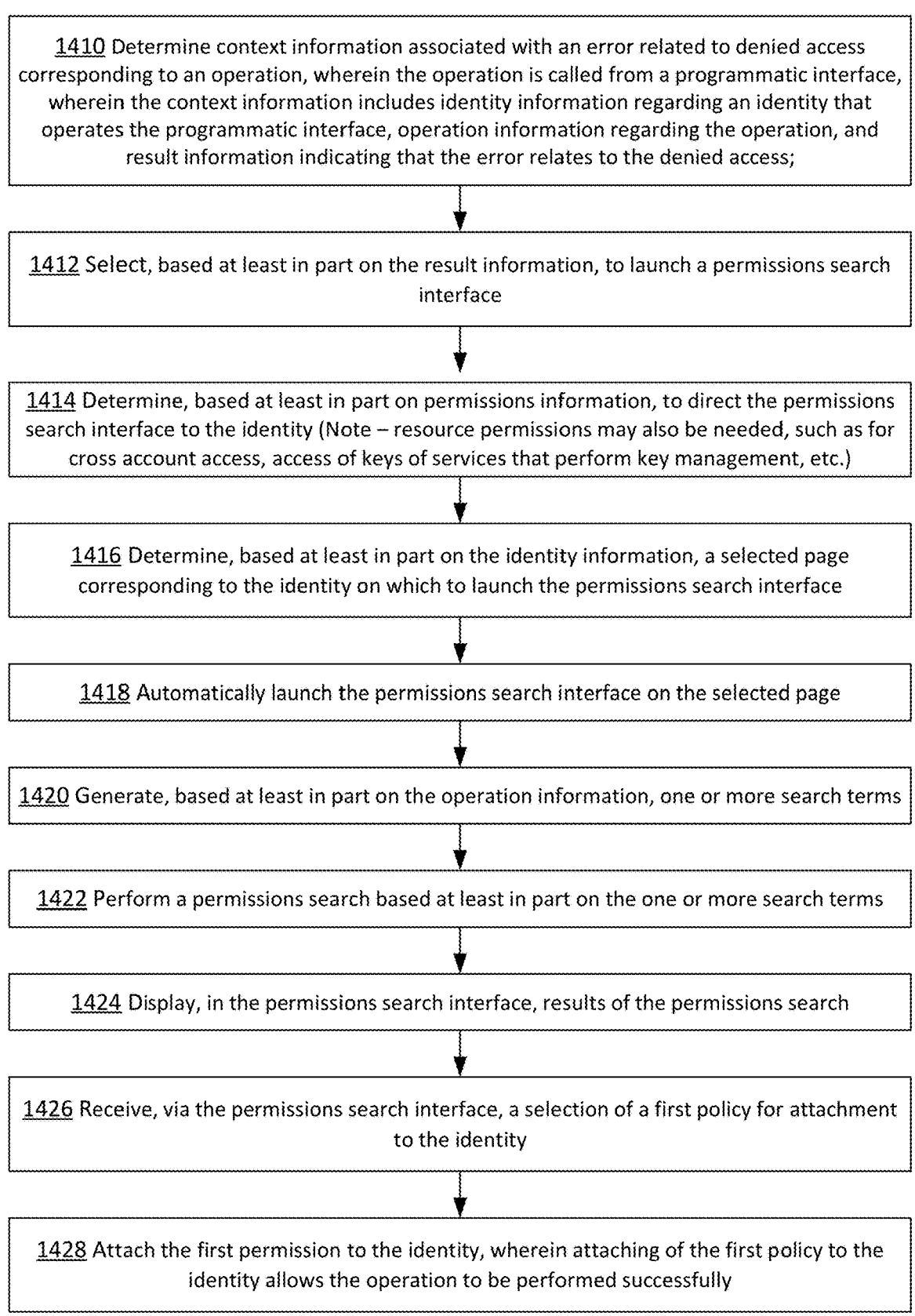
FIG. 14 is a flowchart illustrating an example scenario-based permissions search process that may be used in accordance with the present disclosure.

FIG. 14 is a flowchart illustrating an example scenario-based permissions search process that may be used in accordance with the present disclosure. The process of FIG. 14 is initiated at operation 1410, at which context information (e.g., scenario-based context information 911 of FIG. 9) is obtained, the context information associated with an error related to denied access corresponding to an operation, wherein the operation is called from a programmatic interface, wherein the context information includes identity information regarding an identity that operates the programmatic interface, operation information regarding the operation (e.g., associated service, operation type, resources and other parameters, etc.), and result information indicating that the error relates to the denied access. The context information may also include interface type information that indicates a type of programmatic interface in which the error occurs (e.g., CLI, resource declaration template, development interface, etc.). As described above, in some examples, a context component may obtain the context information from logs, access keys, configuration files, environment variables, and other information sources associated with the programmatic interface. For example, logs associated with the programmatic interface may include metadata that includes any, or all, of the above described information. As another example, access keys, which may be used to authenticate the operator of the programmatic interface, may be used to determine the identity that operates the programmatic interface.

At operation 1412, it is selected, based at least in part on the result information, to launch a permissions search interface. As described above, in some examples, the context component may access stored information that maps certain types of errors or other results to respective types of resolution interfaces. As also described above, in some examples, the result information may indicate that the error is a denial of access error. In these cases, it may be determined, based at least in part on the denial of access error, to launch a permissions search interface. This is because permissions search interfaces may be used to find policies for attachment to an identity and/or resource that may provide permissions that are necessary to successfully execute the operation.

At operation 1414, it is determined, based at least in part on permissions information, to direct the permissions search interface to the identity. For example, in some cases the context component may evaluate the identity's existing permissions to determine whether a permission needs to be added to the identity in order to successfully perform the operation. It is noted that, in some examples, it may also be necessary to add a permission to the resource's policy in order to in order to successfully perform the operation. As described above, in certain scenarios (e.g., cross account resource access or accessing of a key of a service that performs key management), it may be necessary to configure a resource's permissions to allow the identity to access the resource. In these scenarios, an additional permissions search interface may optionally be generated to search for an appropriate policy to attach to the resource.

At operation 1416, a selected page corresponding to the identity on which to launch the permissions search interface is determined, based at least in part on the identity information. For example, identity information 921A of FIG. 11 indicates that CLI 1000 was operated by the My-Example-Role identity when operation 1001 was called from the CLI 1000. Based on the identity information 921A, a determination may be made to launch a permissions search interface on a console page corresponding to the My-Example-Role identity. At operation 1418, the permissions search interface is automatically launched on the selected page. For example, as shown in FIG. 12, policy search page 1200 is launched on a console page corresponding to the My-Example-Role identity.

At operation 1420, one or more search terms are generated based at least in part on the operation information. In some examples, the operation information may indicate a service associated with the operation, and the one or more search terms may include a name of the service. For example, as shown in FIG. 12, the search term XXService is generated in text entry field 111 because operation 1001 included an API call for XXService (as indicated in operation information 923A of FIG. 11). Also, in some examples, the operation information may indicate an operation type of the operation, and the one or more search terms may include an access type associated with the operation type. For example, as shown in FIG. 12, the search term Read is generated in text entry field 111 because operation 1001 was a Get Object operation (as indicated in operation information 923A of FIG. 11).

At operation 1422, a permissions search is performed based at least in part on the one or more search terms. For example, as shown in FIG. 12, a permissions search is performed based on the search terms XXservice and Read that are inserted into text entry field 111. At operation 1424, results of the permissions search are displayed in the permissions search interface. It is noted that the results of the permissions search may be weighted and ranked using any of the techniques described above with reference to FIGS. 1-8. In the example of FIG. 12, the search returns two results, which are displayed on the policy search page 1200. At operation 1426, a selection of a first policy for attachment to the identity is received via the permissions search interface. In the example of FIG. 12, the user selects the first result, which is for the XXServiceReadOnlyAccess policy. At operation 1428, the first policy is attached to the identity. In the example of FIG. 12, the user may then click the select policy button 113 to cause the XXServiceReadOnly policy to be attached to the My-Example-Role identity. Attaching of the first policy to the identity may allow the operation to be performed successfully. For example, attachment of the XXServiceReadOnly policy to the My-Example-Role identity may allow operation 1001 to be performed successfully (if re-attempted by the user).

In some examples, a permissions search or other resolution interface may include documentation that may assist the user in configuring permissions or otherwise resolving an error. For example, in some cases, in addition to listing policies that are returned by a permissions search, a resolution interface may also include links to articles, manuals, and other documentation pages that may assist the user in configuring permissions (e.g., by explaining how a configuration process works) or otherwise resolving an error.

Moreover, in some examples, machine learning techniques may be employed to analyze behaviors of specific users. The types and contents of the resolution interfaces may be specifically targeted to different users based on their respective behaviors. For example, a machine learning model could analyze a given user's behavior to determine that the user does not use resource policies and instead employs identity policies to fix errors. Based on these behaviors, the user may automatically be directed to an identity permissions search page instead of a resource page in order to resolve an error.

In yet other examples, multiple related errors may be detected that may be aggregated and/or resolved in combination with one another, such as errors that occur at the same time (or in close time proximity) or in similar processes. For example, in some cases, this may be particularly advantageous in the case of serverless functions. In one specific example, a serverless function may execute multiple times and return errors related to multiple different IP addresses. In some examples, one or more resolution interfaces may be generated based on a combined context of these multiple errors, thereby enabling testing and resolution of the errors to be performed in combination with one another.

Figure 15:
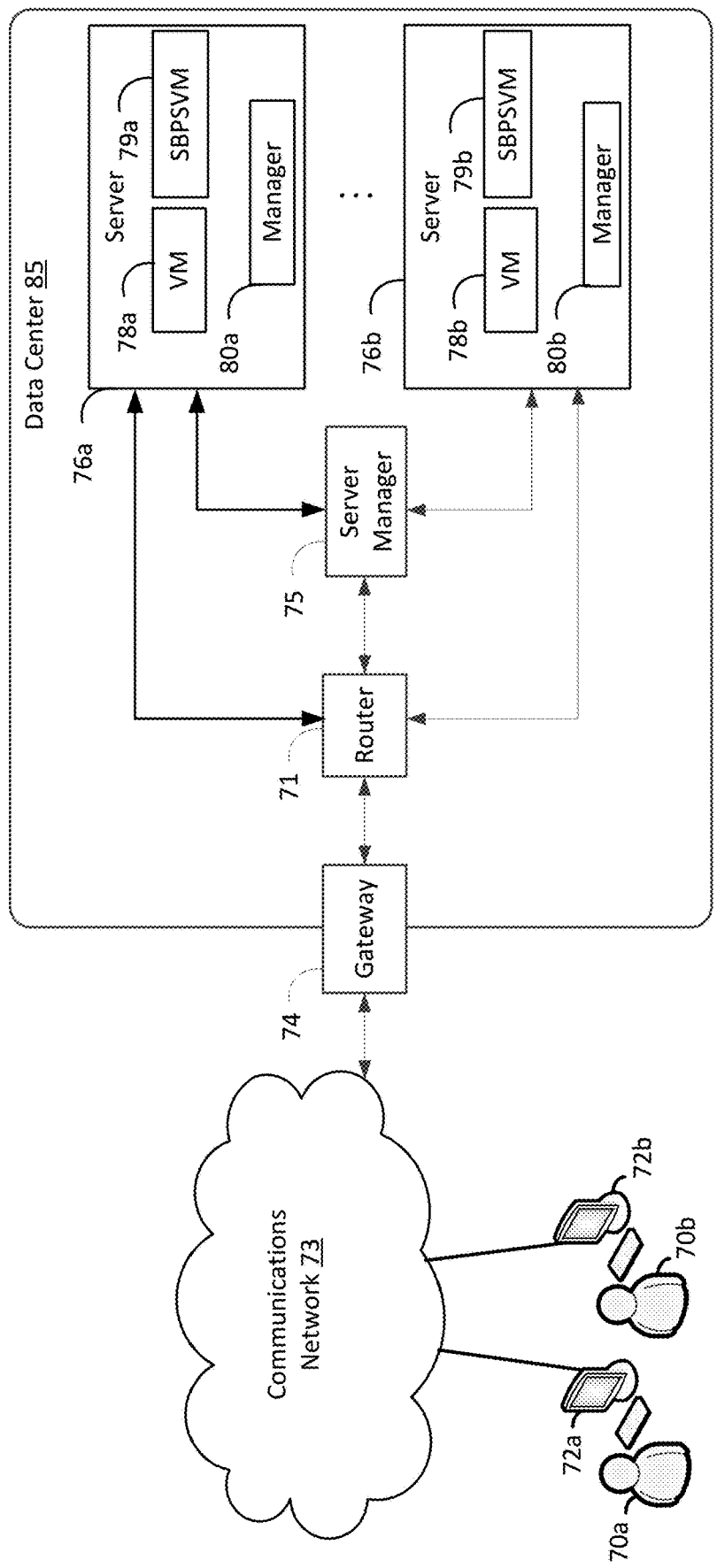
FIG. 15 is a diagram illustrating an example system for transmitting and providing data that may be used in accordance with the present disclosure.

An example system for transmitting and providing data will now be described in detail. In particular, FIG. 15 illustrates an example computing environment in which the embodiments described herein may be implemented. FIG. 15 is a diagram schematically illustrating an example of a data center 85 that can provide computing resources to users 70a and 70b (which may be referred herein singularly as user 70 or in the plural as users 70) via user computers 72a and 72b (which may be referred herein singularly as computer 72 or in the plural as computers 72) via a communications network 73. Data center 85 may be configured to provide computing resources for executing applications on a permanent or an as-needed basis. The computing resources provided by data center 85 may include various types of resources, such as gateway resources, load balancing resources, routing resources, networking resources, computing resources, volatile and non-volatile memory resources, content delivery resources, data processing resources, data storage resources, data communication resources and the like. Each type of computing resource may be available in a number of specific configurations. For example, data processing resources may be available as virtual machine instances that may be configured to provide various web services. In addition, combinations of resources may be made available via a network and may be configured as one or more web services. The instances may be configured to execute applications, including web services, such as application services, media services, database services, processing services, gateway services, storage services, routing services, security services, encryption services, load balancing services, application services and the like. These services may be configurable with set or custom applications and may be configurable in size, execution, cost, latency, type, duration, accessibility and in any other dimension. These web services may be configured as available infrastructure for one or more clients and can include one or more applications configured as a platform or as software for one or more clients. These web services may be made available via one or more communications protocols. These communications protocols may include, for example, hypertext transfer protocol (HTTP) or non-HTTP protocols. These communications protocols may also include, for example, more reliable transport layer protocols, such as transmission control protocol (TCP), and less reliable transport layer protocols, such as user datagram protocol (UDP). Data storage resources may include file storage devices, block storage devices and the like.

Each type or configuration of computing resource may be available in different sizes, such as large resources—consisting of many processors, large amounts of memory and/or large storage capacity—and small resources—consisting of fewer processors, smaller amounts of memory and/or smaller storage capacity. Customers may choose to allocate a number of small processing resources as web servers and/or one large processing resource as a database server, for example.

Data center 85 may include servers 76a and 76b (which may be referred herein singularly as server 76 or in the plural as servers 76) that provide computing resources. These resources may be available as bare metal resources or as virtual machine instances 78a-b (which may be referred herein singularly as virtual machine instance 78 or in the plural as virtual machine instances 78). In this example, the resources also include scenario-based permissions searching virtual machines (SBPSVM's) 79a-b, which are virtual machines that are configured to execute any, or all, of the scenario-based permissions searching techniques described herein, such as to assist in generating a permissions search interface based on context from a programmatic interface as described above.

The availability of virtualization technologies for computing hardware has afforded benefits for providing large scale computing resources for customers and allowing computing resources to be efficiently and securely shared between multiple customers. For example, virtualization technologies may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that span multiple distinct physical computing systems.

Referring to FIG. 15, communications network 73 may, for example, be a publicly accessible network of linked networks and possibly operated by various distinct parties, such as the Internet. In other embodiments, communications network 73 may be a private network, such as a corporate or university network that is wholly or partially inaccessible to non-privileged users. In still other embodiments, communications network 73 may include one or more private networks with access to and/or from the Internet.

Communication network 73 may provide access to computers 72. User computers 72 may be computers utilized by users 70 or other customers of data center 85. For instance, user computer 72a or 72b may be a server, a desktop or laptop personal computer, a tablet computer, a wireless telephone, a personal digital assistant (PDA), an e-book reader, a game console, a set-top box or any other computing device capable of accessing data center 85. User computer 72a or 72b may connect directly to the Internet (e.g., via a cable modem or a Digital Subscriber Line (DSL)). Although only two user computers 72a and 72b are depicted, it should be appreciated that there may be multiple user computers.

User computers 72 may also be utilized to configure aspects of the computing resources provided by data center 85. In this regard, data center 85 might provide a gateway or web interface through which aspects of its operation may be configured through the use of a web browser application program executing on user computer 72. Alternately, a stand-alone application program executing on user computer 72 might access an application programming interface (API) exposed by data center 85 for performing the configuration operations. Other mechanisms for configuring the operation of various web services available at data center 85 might also be utilized.

Servers 76 shown in FIG. 15 may be servers configured appropriately for providing the computing resources described above and may provide computing resources for executing one or more web services and/or applications. In one embodiment, the computing resources may be virtual machine instances 78. In the example of virtual machine instances, each of the servers 76 may be configured to execute an instance manager 80a or 80b (which may be referred herein singularly as instance manager 80 or in the plural as instance managers 80) capable of executing the virtual machine instances 78. The instance managers 80 may be a virtual machine monitor (VMM) or another type of program configured to enable the execution of virtual machine instances 78 on server 76, for example. As discussed above, each of the virtual machine instances 78 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 85 shown in FIG. 15, a router 71 may be utilized to interconnect the servers 76a and 76b. Router 71 may also be connected to gateway 74, which is connected to communications network 73. Router 71 may be connected to one or more load balancers, and alone or in combination may manage communications within networks in data center 85, for example, by forwarding packets or other data communications as appropriate based on characteristics of such communications (e.g., header information including source and/or destination addresses, protocol identifiers, size, processing requirements, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

In the example data center 85 shown in FIG. 15, a server manager 75 is also employed to at least in part direct various communications to, from and/or between servers 76a and 76b. While FIG. 15 depicts router 71 positioned between gateway 74 and server manager 75, this is merely an exemplary configuration. In some cases, for example, server manager 75 may be positioned between gateway 74 and router 71. Server manager 75 may, in some cases, examine portions of incoming communications from user computers 72 to determine one or more appropriate servers 76 to receive and/or process the incoming communications. Server manager 75 may determine appropriate servers to receive and/or process the incoming communications based on factors such as an identity, location or other attributes associated with user computers 72, a nature of a task with which the communications are associated, a priority of a task with which the communications are associated, a duration of a task with which the communications are associated, a size and/or estimated resource usage of a task with which the communications are associated and many other factors. Server manager 75 may, for example, collect or otherwise have access to state information and other information associated with various tasks in order to, for example, assist in managing communications and other operations associated with such tasks.

It should be appreciated that the network topology illustrated in FIG. 15 has been greatly simplified and that many more networks and networking devices may be utilized to interconnect the various computing systems disclosed herein. These network topologies and devices should be apparent to those skilled in the art.

It should also be appreciated that data center 85 described in FIG. 15 is merely illustrative and that other implementations might be utilized. It should also be appreciated that a server, gateway or other computing device may comprise any combination of hardware or software that can interact and perform the described types of functionality, including without limitation: desktop or other computers, database servers, network storage devices and other network devices, PDAs, tablets, cellphones, wireless phones, pagers, electronic organizers, Internet appliances, television-based systems (e.g., using set top boxes and/or personal/digital video recorders) and various other consumer products that include appropriate communication capabilities.

Figure 16:
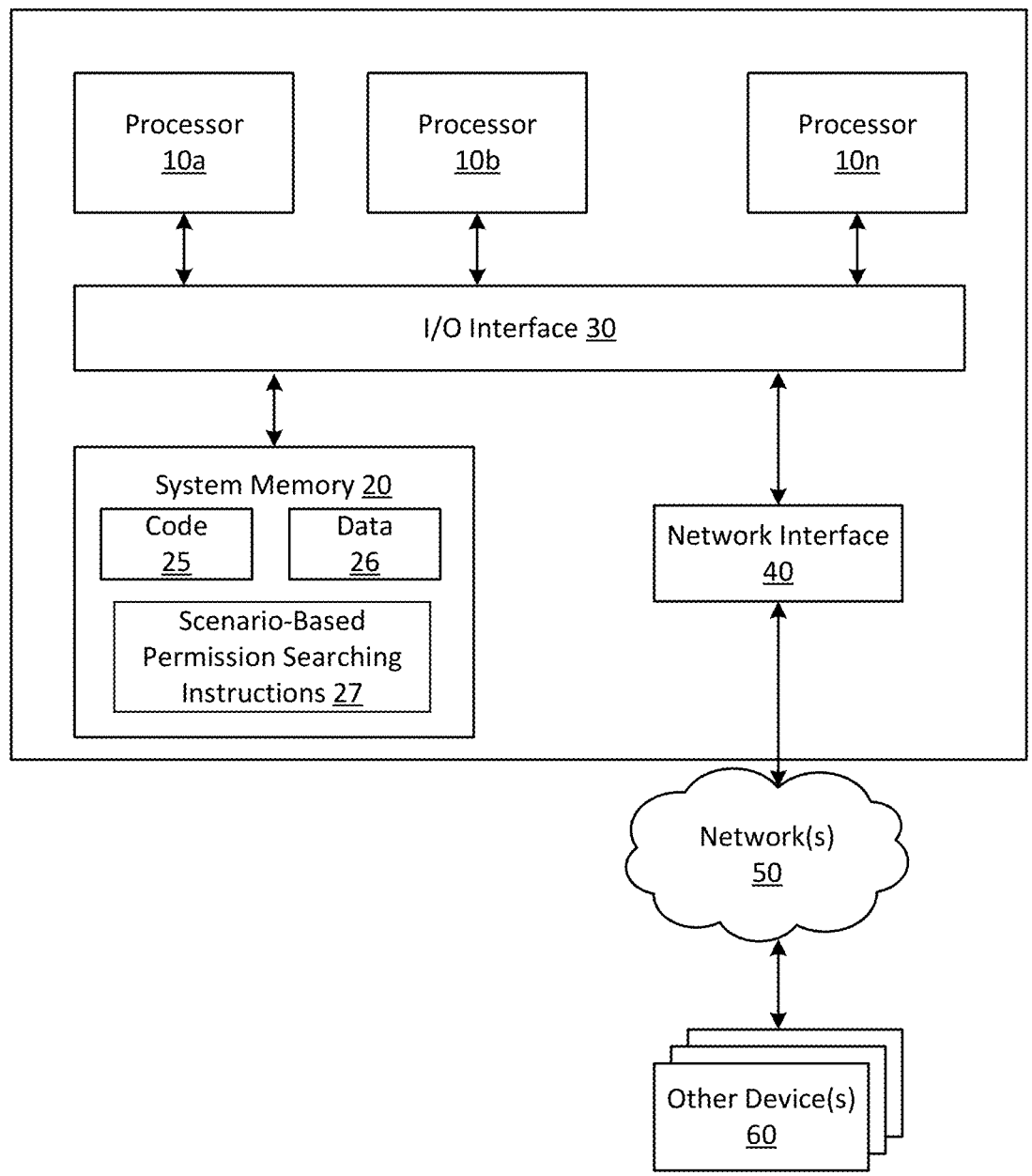
FIG. 16 is a diagram illustrating an example computing system that may be used in accordance with the present disclosure.

In at least some embodiments, a server that implements a portion or all of one or more of the technologies described herein may include a computer system that includes or is configured to access one or more computer-accessible media. FIG. 16 depicts a computer system that includes or is configured to access one or more computer-accessible media. In the illustrated embodiment, computing device 15 includes one or more processors 10a, 10b and/or 10n (which may be referred herein singularly as "a processor 10" or in the plural as "the processors 10") coupled to a system memory 20 via an input/output (I/O) interface 30. Computing device 15 further includes a network interface 40 coupled to I/O interface 30.

In various embodiments, computing device 15 may be a uniprocessor system including one processor 10 or a multiprocessor system including several processors 10 (e.g., two, four, eight or another suitable number). Processors 10 may be any suitable processors capable of executing instructions. For example, in various embodiments, processors 10 may be embedded processors implementing any of a variety of instruction set architectures (ISAs), such as the x86, PowerPC, SPARC or MIPS ISAs or any other suitable ISA. In multiprocessor systems, each of processors 10 may commonly, but not necessarily, implement the same ISA.

System memory 20 may be configured to store instructions and data accessible by processor(s) 10. In various embodiments, system memory 20 may be implemented using any suitable memory technology, such as static random access memory (SRAM), synchronous dynamic RAM (SDRAM), nonvolatile/Flash®-type memory or any other type of memory. In the illustrated embodiment, program instructions and data implementing one or more desired functions, such as those methods, techniques and data described above, are shown stored within system memory 20 as code 25 and data 26. Additionally, in this example, system memory 20 includes scenario-based permissions searching instructions 27, which are instructions for executing any, or all, of the scenario-based permissions searching techniques described herein, such as to assist in generating a permissions search interface based on context from a programmatic interface as described above.

In one embodiment, I/O interface 30 may be configured to coordinate I/O traffic between processor 10, system memory 20 and any peripherals in the device, including network interface 40 or other peripheral interfaces. In some embodiments, I/O interface 30 may perform any necessary protocol, timing or other data transformations to convert data signals from one component (e.g., system memory 20) into a format suitable for use by another component (e.g., processor 10). In some embodiments, I/O interface 30 may include support for devices attached through various types of peripheral buses, such as a variant of the Peripheral Component Interconnect (PCI) bus standard or the Universal Serial Bus (USB) standard, for example. In some embodiments, the function of I/O interface 30 may be split into two or more separate components, such as a north bridge and a south bridge, for example. Also, in some embodiments some or all of the functionality of I/O interface 30, such as an interface to system memory 20, may be incorporated directly into processor 10.

Network interface 40 may be configured to allow data to be exchanged between computing device 15 and other device or devices 60 attached to a network or networks 50, such as other computer systems or devices, for example. In various embodiments, network interface 40 may support communication via any suitable wired or wireless general data networks, such as types of Ethernet networks, for example. Additionally, network interface 40 may support communication via telecommunications/telephony networks, such as analog voice networks or digital fiber communications networks, via storage area networks such as Fibre Channel SANs (storage area networks) or via any other suitable type of network and/or protocol.

In some embodiments, system memory 20 may be one embodiment of a computer-accessible medium configured to store program instructions and data as described above for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media, such as magnetic or optical media—e.g., disk or DVD/CD coupled to computing device 15 via I/O interface 30. A non-transitory computer-accessible storage medium may also include any volatile or non-volatile media, such as RAM (e.g., SDRAM, DDR SDRAM, RDRAM, SRAM, etc.), ROM (read only memory) etc., that may be included in some embodiments of computing device 15 as system memory 20 or another type of memory. Further, a computer-accessible medium may include transmission media or signals such as electrical, electromagnetic or digital signals conveyed via a communication medium, such as a network and/or a wireless link, such as those that may be implemented via network interface 40.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment and the like, needed to implement and distribute the infrastructure and web services offered by the provider network. The resources may in some embodiments be offered to clients in various units related to the web service, such as an amount of storage capacity for storage, processing capability for processing, as instances, as sets of related services and the like. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A compute node, which may be referred to also as a computing node, may be implemented on a wide variety of computing environments, such as commodity-hardware computers, virtual machines, web services, computing clusters and computing appliances. Any of these computing devices or environments may, for convenience, be described as compute nodes.

A number of different types of computing devices may be used singly or in combination to implement the resources of the provider network in different embodiments, for example computer servers, storage devices, network devices and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java™ virtual machines (JVMs), general-purpose or special-purpose operating systems, platforms that support various interpreted or compiled programming languages such as Ruby, Perl, Python, C, C++ and the like or high-performance computing platforms) suitable for the applications, without, for example, requiring the client to access an instance or an execution platform directly. A given execution platform may utilize one or more resource instances in some implementations; in other implementations, multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server or some combination of the two. Various types and configurations of instances may be made available, including different sizes of resources executing different operating systems (OS) and/or hypervisors, and with various installed software applications, runtimes and the like. Instances may further be available in specific availability zones, representing a logical region, a fault tolerant region, a data center or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

As set forth above, content may be provided by a content provider to one or more clients. The term content, as used herein, refers to any presentable information, and the term content item, as used herein, refers to any collection of any such presentable information. A content provider may, for example, provide one or more content providing services for providing content to clients. The content providing services may reside on one or more servers. The content providing services may be scalable to meet the demands of one or more customers and may increase or decrease in capability based on the number and type of incoming client requests. Portions of content providing services may also be migrated to be placed in positions of reduced latency with requesting clients. For example, the content provider may determine an "edge" of a system or network associated with content providing services that is physically and/or logically closest to a particular client. The content provider may then, for example, "spin-up," migrate resources or otherwise employ components associated with the determined edge for interacting with the particular client. Such an edge determination process may, in some cases, provide an efficient technique for identifying and employing components that are well suited to interact with a particular client, and may, in some embodiments, reduce the latency for communications between a content provider and one or more clients.

In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g." and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having" and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some or all of the elements in the list.

While certain example embodiments have been described, these embodiments have been presented by way of example only and are not intended to limit the scope of the inventions disclosed herein. Thus, nothing in the foregoing description is intended to imply that any particular feature, characteristic, step, module or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A computing system comprising:
   one or more processors; and
   one or more memories having stored therein instructions that, upon execution by one or more computer processors, cause the one or more computer processors to perform acts comprising:
      obtaining context information associated with an error related to denied access corresponding to an operation, wherein the operation is called from a programmatic interface, wherein the context information includes identity information regarding an identity that operates the programmatic interface, operation information regarding the operation, and result information indicating that the error relates to the denied access;
      selecting, based at least in part on the result information, to launch a permissions search interface;
      determining, based at least in part on the identity information, a selected page corresponding to the identity on which to launch the permissions search interface;
      automatically launching the permissions search interface on the selected page;
      generating, based at least in part on the operation information, one or more search terms;
      performing a permissions search based at least in part on the one or more search terms;
      displaying, in the permissions search interface, results of the permissions search;
      receiving, via the permissions search interface, a selection of a first policy for attachment to the identity; and
      attaching the first policy to the identity.

2. The computing system of claim 1, wherein the attaching of the first policy to the identity allows the operation to be performed successfully.

3. The computing system of claim 1, wherein the operation information indicates a service associated with the operation, and wherein the one or more search terms comprise a name of the service.

4. The computing system of claim 1, wherein the operation information indicates an operation type of the operation, and wherein the one or more search terms comprise an access type associated with the operation type.

5. A computer-implemented method comprising:
obtaining context information associated with an error corresponding to an operation, wherein the operation is defined in a programmatic interface, wherein the context information includes identity information regarding an identity that operates the programmatic interface, operation information regarding the operation, and result information regarding a result of the operation;
selecting, based at least in part on the context information, a selected resolution interface type for a resolution interface to assist in resolving the error;
determining one or more entities to which the resolution interface is directed;
determining, based at least in part on the context information, scenario-based contents of the resolution interface;
automatically launching the resolution interface directed to the one or more entities and including the scenario-based contents; and
receiving, based at least in part on the resolution interface, input for resolving the error.

6. The computer-implemented method of claim 5, wherein the programmatic interface is a command line interface, and wherein the resolution interface is launched in a console interface.

7. The computer-implemented method of claim 5, wherein the programmatic interface is a resource declaration template, and wherein the resolution interface is launched in the resource declaration template.

8. The computer-implemented method of claim 5, wherein the result information indicates that the error is a denial of access error.

9. The computer-implemented method of claim 8, wherein the selecting of the selected resolution interface type comprises determining, based at least in part on the denial of access error, that the selected resolution interface type is a permissions search interface type.

10. The computer-implemented method of claim 5, wherein the determining of the one or more entities to which the resolution interface is directed comprises determining, based at least in part on existing permissions information, whether the resolution interface will be directed to the identity, to a resource accessed by the operation, or to both the identity and the resource.

11. The computer-implemented method of claim 5, wherein the determining of the one or more entities to which the resolution interface is directed is based at least in part on whether the operation requires a cross account resource access.

12. The computer-implemented method of claim 5, wherein the determining of the scenario-based contents comprises generating, based at least in part on the operation information, one or more search terms.

13. The computer-implemented method of claim 12, wherein the operation information indicates a service associated with the operation, and wherein the one or more search terms comprise a name of the service.

14. The computer-implemented method of claim 12, wherein the operation information indicates an operation type of the operation, and wherein the one or more search terms comprise an access type associated with the operation type.

15. The computer-implemented method of claim 5, wherein the receiving of the input for resolving the error, comprises, receiving, via a permissions search interface, a selection of a first policy for attachment to the identity.

16. The computer-implemented method of claim 5, wherein the programmatic interface is a development interface, and wherein the context information is determined as part of a static analysis on the development interface.

17. One or more non-transitory computer-readable storage media having stored thereon computing instructions that, upon execution by one or more computing devices, cause the one or more computing devices to perform acts comprising:
obtaining context information associated with an error corresponding to an operation, wherein the operation is defined in a programmatic interface, wherein the context information includes identity information regarding an identity that operates the programmatic interface, operation information regarding the operation, and result information regarding a result of the operation;
selecting, based at least in part on the context information, a selected resolution interface type for a resolution interface to assist in resolving the error;
determining one or more entities to which the resolution interface is directed;
determining, based at least in part on the context information, scenario-based contents of the resolution interface;
automatically launching the resolution interface directed to the one or more entities and including the scenario-based contents; and
receiving, based at least in part on the resolution interface, input for resolving the error.

18. The one or more non-transitory computer-readable storage media of claim 17, wherein the determining of the scenario-based contents comprises generating, based at least in part on the operation information, one or more search terms.

19. The one or more non-transitory computer-readable storage media of claim 17, wherein the determining of the one or more entities to which the resolution interface is directed comprises determining, based at least in part on existing permissions information, whether the resolution interface will be directed to the identity, to a resource accessed by the operation, or to both the identity and the resource.

20. The one or more non-transitory computer-readable storage media of claim 17, wherein the receiving of the input for resolving the error, comprises, receiving, via a permissions search interface, a selection of a first policy for attachment to the identity.

* * * * *